(12) United States Patent
Yasui et al.

(10) Patent No.: US 8,671,660 B2
(45) Date of Patent: Mar. 18, 2014

(54) CATALYST DEGRADATION DETERMINATION DEVICE FOR EXHAUST PURIFICATION SYSTEM

(75) Inventors: Yuji Yasui, Saitama (JP); Eiji Hashimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 601 days.

(21) Appl. No.: 12/962,039

(22) Filed: Dec. 7, 2010

(65) Prior Publication Data

US 2011/0131956 A1 Jun. 9, 2011

(30) Foreign Application Priority Data

Dec. 9, 2009 (JP) ................................. 2009-279654

(51) Int. Cl.
*F01N 3/00* (2006.01)
*F01N 3/10* (2006.01)

(52) U.S. Cl.
USPC ................ 60/277; 60/286; 60/295; 60/301; 60/303

(58) Field of Classification Search
USPC ................. 60/276, 277, 286, 295, 301, 303
See application file for complete search history.

(56) References Cited

U.S. PATENT DOCUMENTS

| | | | |
|---|---|---|---|
| 6,546,720 B2* | 4/2003 | van Nieuwstadt | 60/286 |
| 7,428,809 B2* | 9/2008 | Wickert et al. | 60/286 |
| 7,610,750 B2* | 11/2009 | Viola et al. | 60/286 |
| 2006/0000202 A1 | 1/2006 | Ripper et al. | |
| 2010/0028228 A1 | 2/2010 | Gady et al. | |
| 2010/0326051 A1 | 12/2010 | Busch et al. | |

FOREIGN PATENT DOCUMENTS

| | | |
|---|---|---|
| DE | 10 2007 040 439 A1 | 3/2009 |
| JP | 2007-170383 A | 7/2007 |
| JP | 2009-127496 A | 6/2009 |
| JP | 2009-138626 A | 6/2009 |
| WO | WO 2010/103380 A1 | 9/2010 |

* cited by examiner

*Primary Examiner* — Thomas Denion
*Assistant Examiner* — Diem Tran
(74) *Attorney, Agent, or Firm* — Arent Fox LLP

(57) ABSTRACT

A catalyst degradation determination device is provided that can determine the degradation of a selective reduction catalyst with high precision while also suppressing a temporary decline in purification performance. By way of controlling a urea injection device, the catalyst degradation determination device increases, in a selective reduction catalyst in a state in which the storage amount is a maximum, the storage amount thereof by a detection reduced-amount portion $DST_{NH3\_JD}$, and then decreases the amount until it is determined that ammonia slip has occurred. Then, degradation is determined based on the time at which the slip determination flag $F_{NH3\_SLIP}$ was set to "1" when fluctuating the storage amount. The detection reduced-amount portion $DST_{NH3\_JD}$ is set to a value that is larger than the storage capacity of the selective reduction catalyst in a degraded state and smaller than the storage capacity of the selective reduction catalyst in a normal state.

10 Claims, 20 Drawing Sheets

CATALYST DEGRADATION DETERMINATION DEVICE FOR EXHAUST PURIFICATION SYSTEM

This application is based on and claims the benefit of priority from Japanese Patent Application No. 2009-279654, filed on 9 Dec. 2009, the content of which is incorporated herein by reference.

BACKGROUND OF THE INVENTION

1. Field of the Invention

The present invention relates to a catalyst degradation determination device for an exhaust purification system. In particular, it relates to a catalyst degradation determination device for an exhaust purification system equipped a selective reduction catalyst that reduces NOx in exhaust under the presence of a reducing agent.

2. Related Art

Conventionally, as one exhaust purification system that purifies NOx in exhaust, a system has been proposed in which a selective reduction catalyst that selectively reduces NOx in the exhaust by way of a reducing agent is provided in an exhaust channel. For example, with an exhaust purification system of urea addition type, urea water is supplied from an upstream side of the selective reduction catalyst, ammonia is generated by thermal decomposition or hydrolysis of this urea water by the heat of the exhaust, and the NOx in the exhaust is selectively reduced by this ammonia. It should be noted that, in addition to such a system of urea addition type, for example, a system has also been proposed that generates ammonia by heating a compound of ammonia such as ammonia carbide, and directly adds this ammonia.

In an exhaust purification system equipped with a selective reduction catalyst, when degradation of the selective reduction catalyst progresses to a certain extent, it is necessary to replace this with a new catalyst in order to continuously maintain the exhaust purification performance thereof to be high. In the current situation, a degradation determination device that determines the degradation while the catalyst remains installed in the vehicle, i.e. during running of the vehicle, has been built into the current exhaust purification system in order to notify a time, which is an estimate for replacement of the selective reduction catalyst, to the driver or a service technician. Hereinafter, conventional technology for determining the degradation of a selective reduction catalyst will be explained with an exhaust purification system of urea addition type as an example.

FIG. 22 is a graph showing temperature characteristics of the NOx purification rate of a selective reduction catalyst. In FIG. 22, the NOx purification rate of a catalyst that is a new article is shown by the dashed-dotted line, and the NOx purification rate of a catalyst that has degraded from the new-article state is shown by the solid line.

For example, with the degradation determination device illustrated in Patent Document 1, degradation of a catalyst is determined based on detection of the NOx purification rate of the selective reduction catalyst, using the fact that the NOx purification rate will decline with the progression of degradation of the selective reduction catalyst, as shown in FIG. 22. More specifically, the NOx purification rate is estimated by estimating the NOx amount flowing into the selective reduction catalyst based on the operating state of the internal combustion engine, while detecting the NOx amount on a downstream side of the selective reduction catalyst, and then comparing this estimated value of the upstream side and detected value of the downstream side. Then, the degradation of the catalyst is determined based on the NOx purification rate thus estimated.

Incidentally, in addition to the ability to reduce NOx under the presence of ammonia, there is the ability to store ammonia generated in the selective reduction catalyst. Hereinafter, the ammonia amount stored in the selective reduction catalyst is referred to as storage amount, and the ammonia amount that can be stored in the selective reduction catalyst, i.e. maximum value of the storage amount, is referred to as storage capacity.

FIG. 23 is a graph showing temperature characteristics of the storage capacity of a selective reduction catalyst. In FIG. 23, the storage capacity of a catalyst that is a new article is shown by the dashed-dotted line, and the storage capacity of a catalyst that has degraded from the new-article state is shown by the solid line. It should be noted that, for comparison with the above FIG. 22, the same type of catalyst as the catalysts shown in FIG. 22 is used for this catalyst that is a new article and the degraded catalyst.

As shown in FIG. 23, the storage capacity of the selective reduction catalyst has a characteristic of declining over the entire temperature range when degradation of the catalyst progresses. In addition, as is evident from comparing FIG. 22 with FIG. 23, the magnitude of the change accompanying the progression of degradation becomes larger for the storage capacity than the NOx purification rate. This shows that the ammonia storage performance of the selective reduction catalyst is more suited as an index used in the determination of degradation than the NOx purification performance due to being able to improve the SN ratio.

Technology focusing on such ammonia storage performance of a selective reduction catalyst is illustrated in Patent Document 2 and Patent Document 3.

In Patent Document 2, a device is illustrated that, when the temperature of the selective reduction catalyst declines past a temperature region in which NOx can be purified, supplies urea water until ammonia slip occurs, converts a total amount of urea water supplied in this process to an ammonia adsorbed amount, and diagnoses the degradation of the selective reduction catalyst based on this ammonia adsorbed amount. Since ammonia slip occurs in response to the storage amount of the selective reduction catalyst having exceeded the storage capacity, it has been considered that the total amount of urea supplied in excess has a correlation to the storage capacity of the selective reduction catalyst; therefore, it may be said that the degradation of the catalyst is determined based on the storage capacity of the selective reduction catalyst with this device of Patent Document 2.

In addition, similarly to the device of Patent Document 2, a method is illustrated in Patent Document 3 of continuously supplying urea water until ammonia slip occurs at a predetermined reference operational point, and estimating the storage capacity of the selective reduction catalyst based on the total amount of urea water supplied in this process.

Patent Document 1: Japanese Unexamined Patent Application Publication No. 2009-138626
Patent Document 2: Japanese Unexamined Patent Application Publication No. 2009-127496
Patent Document 3: Japanese Unexamined Patent Application Publication no. 2007-170383

SUMMARY OF THE INVENTION

However, with the device of Patent Document 2, the storage amount of the selective reduction catalyst when initiating the supply of urea water for degradation determination is indefinite, and thus becomes a parameter that differs each time performing degradation determination. If the initial storage amount changes, the time from initiating the supply of urea water until ammonia slip occurs will also change, and thus the degradation determination precision by this device is considerably low.

In addition, although urea water is intended to be supplied in a low temperature region such that NOx cannot be purified by the selective reduction catalyst with the device of Patent Document 2, ammonia cannot be generated by hydrolysis even by supplying urea water in such a low temperature region, and thus it is considered that ammonia slip also cannot occur.

In addition, since the initial storage amount is indefinite also in the method illustrated in Patent Document 3, the time until ammonia slip occurs for each time performing examination on the storage capacity will change, and thus it is considered that the estimation precision of the storage capacity is considerably low. In Patent Document 3, the time after the completion of regeneration of a particulate matter collection filter is given as a specific time at which examination of the storage capacity is initiated.

In a case of regenerating a particulate matter collection filter, although this filter rises in temperature up to about 600° C., which is the combustion temperature of particulate matter, by the exhaust rising in temperature, the temperature of the selective reduction catalyst also rises at this time, and thus ammonia that had been stored is also released. In other words, after completion of regeneration of the filter, the selective reduction catalyst is in a state in which the storage amount is initialized to approximately zero. Therefore, the initial storage amount can be specified as zero by initiating examination of the storage capacity after completion of regeneration of the filter.

However, after regeneration of the filter, the high temperature state of the selective reduction catalyst continues due to the residual heat of regeneration. As shown in FIG. 23, the storage capacity of the selective reduction catalyst decreases with the temperature rising. As a result, estimating the storage capacity with high precision is difficult, even if initiating examination of the storage capacity of the selective reduction catalyst after regeneration of the filter. Therefore, an improvement in the determination precision thereof cannot be expected, even if applying the method illustrated in Patent Document 3 to catalyst degradation determination.

The present invention was made taking the above points into account, and provides a catalyst degradation determination device for an exhaust purification system equipped with a selective reduction catalyst, that can determine the degradation with high precision, while also suppressing a temporary decline in the purification performance accompanying this determination.

In order to achieve the above-mentioned object, the present invention provides a catalyst degradation determination device for an exhaust purification system (e.g., the exhaust purification system 2 described later) of an internal combustion engine equipped with a selective reduction catalyst (e.g., the selective reduction catalyst 23 described later) that is provided in an exhaust channel (e.g., the exhaust channel 11 described later) of the internal combustion engine (e.g., the engine 1 described later) and reduces NOx in exhaust flowing through the exhaust channel under the presence of a reducing agent (e.g., the ammonia described later), and a reducing agent supply means (e.g., the urea injection device 25 described later) that supplies a reducing agent of an additive serving as a source of the reducing agent (e.g., the urea water described later) to the selective reduction catalyst. The catalyst degradation determination device for an exhaust purification system includes: a slip determination means (e.g., the ammonia sensor 26 and slip determination portion 34 described later) for determining the occurrence of reducing agent slip (e.g., the ammonia slip described later) in the selective reduction catalyst; a storage amount fluctuating means (e.g., the urea injection device 25, switching injection amount calculation portion 32, and estimation unit 35 described later) for reducing, in a selective reduction catalyst in a state in which the storage amount is a maximum, the storage amount thereof by a predetermined detection reduced-amount portion (e.g., the detection reduced-amount portion $DST_{NH3\_JD}$ described later) by way of controlling the reducing agent supply means, and then increasing the storage amount thereof until it is determined by way of the slip determination means that reducing agent slip has occurred; and a catalyst degradation determination means for determining degradation of the selective reduction catalyst based on determination results (e.g., the time at which the slip determination flag $F_{NH3\_SLIP}$ described later is set to "1" from "0") of the slip determination means when fluctuating the storage amount by way of the storage amount fluctuating means, in which the amount of reducing agent stored in the selective reduction catalyst is defined as the storage amount and the amount of reducing agent that can be stored in the selective reduction catalyst is defined as the storage capacity. The detection reduced-amount portion is set to a value that is larger than the storage capacity (e.g., the degraded reference storage capacity $ST_{NH3\_MAX\_NGCAT}$ described later) of the selective reduction catalyst in a predetermined degradation state, and smaller than the storage capacity (e.g., the normal reference storage capacity $ST_{NH3\_MAX\_OKCAT}$ described later) of the selective reduction catalyst in a predetermined normal state.

According to this invention, for a selective reduction catalyst in a state in which the storage amount is a maximum, the storage amount thereof is reduced by a predetermined detection reduced-amount portion, and then increased until it is determined by the slip determination means that reducing agent slip has occurred, and degradation of the selective reduction catalyst is determined based on the determination results at this time from the determination means.

Herein, the above-mentioned detection reduced-amount portion is set to a value that is larger than the storage capacity of the selective reduction in a predetermined degraded state, and smaller than a storage capacity of the selective reduction catalyst in a predetermined normal state. With this, it is possible to prevent a temporary decline in purification performance accompanying the determination of degradation, since the storage amount does not become zero while fluctuating the storage amount of the selective reduction catalyst in order to determine degradation, in a case of the selective reduction catalyst at least being in a normal state. In addition, it is possible to raise the determination precision by determining degradation based on the storage capacity of the selective reduction catalyst in this way.

In this case, it is preferable for the catalyst degradation determination means to determine degradation of the selective reduction catalyst based on a difference (e.g., the slip occurrence time difference $DPRD_{NH3\_SLIP}$ described later) between a predetermined reference parameter (e.g., the estimated slip occurrence timing $PRD_{NH3\_SLIP\_HAT}$ described later) and a parameter (e.g., the slip occurrence timing $PRD_{NH3\_SLIP}$ described later) correlated to an elapsed time since initiating a decrease in storage amount by way of the storage amount fluctuating means until it is determined by the slip determination means that reducing agent slip has occurred.

According to this invention, the degradation determination precision can be improved by determining degradation based on the difference between a reference parameter and a parameter correlated to an elapsed time since initiating a decrease in the storage amount until it is determined that reducing agent slip has occurred.

In this case, it is preferable for the catalyst degradation determination means to determine degradation of the selective reduction catalyst based on a difference (e.g., the slip occurrence time difference $DPRD_{NH3\_SLIP}'$ described later) between a predetermined reference parameter (e.g., the estimated slip occurrence timing $PRD_{NH3\_SLIP\_HAT}'$ described later) and a parameter (e.g., the slip occurrence timing $PRD_{NH3\_SLIP}$ described later) correlated to an elapsed time since initiating an increase in storage amount by way of the storage amount fluctuating means until it is determined by the slip determination means that reducing agent slip has occurred.

According to this invention, the degradation determination precision can be improved by determining degradation based on the difference between a reference parameter and a parameter correlated to an elapsed time since initiating an increase in the storage amount until it is determined that reducing agent slip has occurred.

In this case, it is preferable for the catalyst degradation determination means to determine degradation of the selective reduction catalyst based on a difference (e.g., the slip occurrence time storage amount difference $DSUM_{UREA\_SLIP}$ described later) between a predetermined reference parameter (e.g., the estimated slip occurrence time variation amount $SUM_{UREA\_SLIP\_HAT}$ described later) and a parameter (e.g., the slip occurrence time variation amount $SUM_{UREA\_SLIP}$ described later) correlated to a variation in storage amount during a time from initiating a decrease in storage amount by way of the storage amount fluctuating means until it is determined by the slip determination means that reducing agent slip has occurred.

According to this invention, the degradation determination precision can be improved by determining degradation based on the difference between a reference parameter and a parameter correlated to a variation in the storage amount during the time from initiating a decrease in the storage amount until it is determined that reducing agent slip has occurred.

In this case, it is preferable for the catalyst degradation determination means to determine degradation of the selective reduction catalyst based on a difference (e.g., the slip occurrence time storage amount difference $DSUM_{UREA\_SLIP}'$ described later) between a predetermined reference parameter (e.g., the estimated slip occurrence time variation amount $SUM_{UREA\_SLIP\_HAT}'$ described later) and a parameter (e.g., the slip occurrence time variation amount $SUM_{UREA\_SLIP}'$ described later) correlated to a variation in storage amount during a time from initiating an increase in storage amount by way of the storage amount fluctuating means until it is determined by the slip determination means that reducing agent slip has occurred.

According to this invention, the degradation determination precision can be improved by determining degradation based on the difference between a reference parameter and a parameter correlated to a variation in the storage amount during the time from initiating an increase in the storage amount until it is determined that reducing agent slip has occurred.

In this case, it is preferable for the reference parameter to be calculated based on an estimated value (e.g., the storage amount estimated value $ST_{NH3}$ described later) of the selective reduction catalyst in a predetermined reference state (e.g., the new-article state described later).

According to this invention, even in a case of the running conditions changing, such as the temperature of the selective reduction catalyst, operating load of the internal combustion engine, and fluctuating state of this operating load, since this change can be assumed to be a reference parameter by calculating the reference parameter based on an estimated value of the storage amount of the selective reduction catalyst in a predetermined reference state, it is possible to make the degradation determination results unaffected by the running conditions. Therefore, the determination precision of the degradation of the selective reduction catalyst can be further improved.

In this case, it is preferable for the storage amount fluctuating means to fluctuate the storage amount in a selective reduction catalyst that is in a state in which the storage amount is a maximum and the temperature thereof is within a range (e.g., the temperature range for detection ($T_{SCR\_JD\_L}$, $T_{SCR\_JD\_H}$) described later) in which NOx in the exhaust can be purified.

According to this invention, NOx in exhaust can be reliably purified even while determining the degradation, by fluctuating the storage amount in a selective reduction catalyst that is in a state in which the storage amount is a maximum and the temperature thereof is within a range in which NOx in the exhaust can be purified. Therefore, it is possible to further suppress a temporary decline in the purification performance accompanying the determination of degradation.

DETAILED DESCRIPTION OF THE INVENTION

Figure 1:
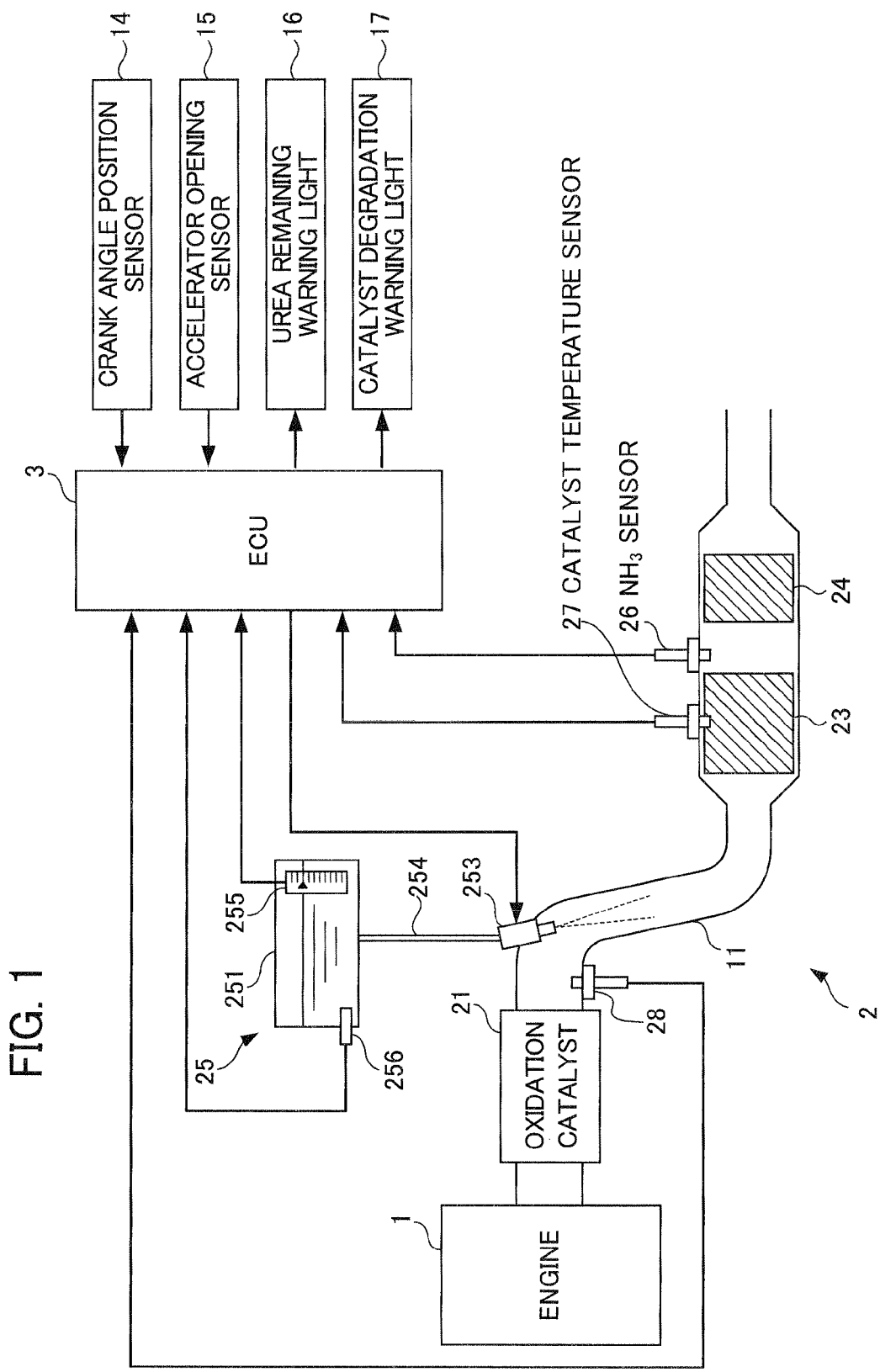
FIG. 1 is a schematic diagram showing configurations of an exhaust purification system of an engine and a catalyst degradation determination device thereof according to an embodiment of the present invention.

One embodiment of the present invention will be explained hereinafter while referring to the drawings. FIG. 1 is a schematic diagram showing configurations of an exhaust purification system 2 of an internal combustion engine (hereinafter referred to as "engine") 1 and a catalyst degradation determination device thereof according to the embodiment of the present invention. The engine 1 is a gasoline engine of lean-burn operating type or a diesel engine, and is mounted in a vehicle, which is not illustrated.

The exhaust purification system 2 is configured to contain a selective reduction catalyst 23 that is provided in an exhaust channel 11 of the engine 1 and purifies nitrogen oxides (hereinafter referred to as "NOx") in exhaust flowing through this exhaust channel 11 under the presence of ammonia as a reducing agent, a urea injection device 25 that supplies urea water, which is a source of the reducing agent, into the exhaust channel 11 on an upstream side of the selective reduction catalyst 23, and an electronic control unit (hereinafter referred to as "ECU") 3. In addition to the selective reduction catalyst 23, an oxidation catalyst 21 and a slip suppressing catalyst 24 are provided in the exhaust channel 11.

The urea injection device 25 includes a urea tank 251 and a urea injection valve 253.

The urea tank 251 stores urea water, and is connected to the urea injection valve 253 via a urea supply pipe 254 and a urea pump, which is not illustrated. A urea level sensor 255 and a urea concentration sensor 256 are provided to this urea tank 251. The urea level sensor 255 detects the water level of the urea water in the urea tank 251, and outputs a detection signal substantially proportional to this water level to the ECU 3. The urea concentration sensor 256 detects the concentration of the urea water stored in the urea tank 251, and outputs a detection signal substantially proportional to the concentration to the ECU 3.

The urea injection valve 253 is connected to the ECU 3, operates according to a control signal from the ECU 3, and injects urea water into the exhaust channel 11 in accordance with this control signal. In other words, urea injection control is executed.

The oxidation catalyst 21 is provided more on an upstream side in the exhaust channel 11 than the urea selective reduction catalyst 23 and the urea injection valve 253, and converts a portion of NO in the exhaust to $NO_2$, thereby promoting the reduction of NOx in the selective reduction catalyst 23.

The selective reduction catalyst 23 selectively reduces NOx in exhaust under an atmosphere in which a reducing agent such as ammonia is present. More specifically, when urea water is injected by the urea injection device 25, this urea water is thermally decomposed or hydrolyzed by the heat of the exhaust, and ammonia is produced. The ammonia thus produced is supplied to the selective reduction catalyst 23, and NOx in the exhaust is selectively reduced by this ammonia.

This selective reduction catalyst 23 has a function of reducing NOx in the exhaust by the ammonia produced from the urea water, as well as having a function of storing only a predetermined amount of the ammonia thus generated. Hereinafter, the ammonia amount stored in the selective reduction catalyst 23 is defined as a storage amount, and the ammonia amount that can be stored in the selective reduction catalyst 23 is defined as a storage capacity.

The ammonia stored in the selective reduction catalyst 23 in this way is also consumed as appropriate in the reduction of NOx in the exhaust. As a result, the NOx purification rate of the selective reduction catalyst 23 increases in accordance with the storage amount increasing. On the other hand, when the storage amount reaches the storage capacity and the selective reduction catalyst 23 enters a saturated state, although the NOx purification rate also reaches a maximum value, ammonia slip occurs in which the ammonia not contributing to the reduction of NOx and has become surplus is discharged to a downstream side of the selective reduction catalyst 23.

Figure 2:
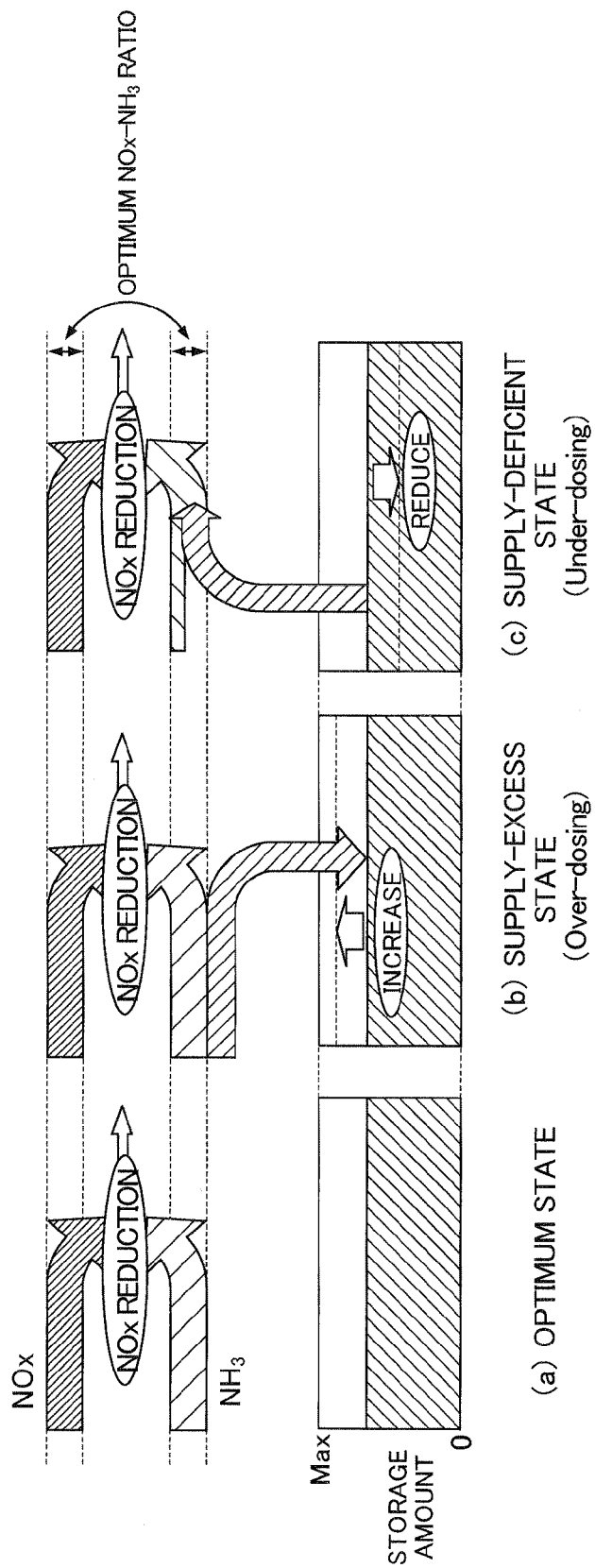
FIG. 2 is a diagram schematically showing a relationship between the supply state of urea water and the change in the storage amount of a selective reduction catalyst.

FIG. 2 is a diagram schematically showing a relationship between the supply states of urea water and the change in the storage amount of the selective reduction catalyst. As shown in FIG. 2, the supply states of urea water are categorized into three states according to the size of the urea injection amount relative to the NOx concentration of exhaust flowing into the selective reduction catalyst: optimum state ((a) of FIG. 2), supply-excess (over-dosing) state ((b) of FIG. 2), and supply-deficient (under-dosing) state ((c) of FIG. 2).

The optimum state shown in (a) of FIG. 2 refers to a state in which the urea injection amount is optimal relative to the NOx flowing into the selective reduction catalyst, i.e. a state in which the amount of ammonia that can most efficiently reduce NOx in the exhaust and the amount of ammonia generated from the urea water supplied substantially match. In this case, the storage amount does not change.

The supply-excess state shown in (b) of FIG. 2 refers to a state in which the urea injection amount is excessive relative to the NOx flowing into the selective reduction catalyst, i.e. a state in which the amount of ammonia generated from the urea water supplied is larger than the amount that can most efficiently reduce the NOx in the exhaust. In this case, the ammonia of a surplus amount is stored in the selective reduction catalyst. Therefore, the storage amount increases in such a supply-excess state.

The supply-deficient state shown in (c) of FIG. 2 refers to a state in which the urea injection amount is deficient relative to the NOx flowing into the selective reduction catalyst, i.e. a state in which the amount of ammonia generated from the urea water supplied is less than the amount that can most efficiently reduce the NOx in the exhaust. In this case, the deficient amount is supplemented by the stored ammonia. Therefore, the storage amount reduces in such a supply-deficient state.

Figure 3:
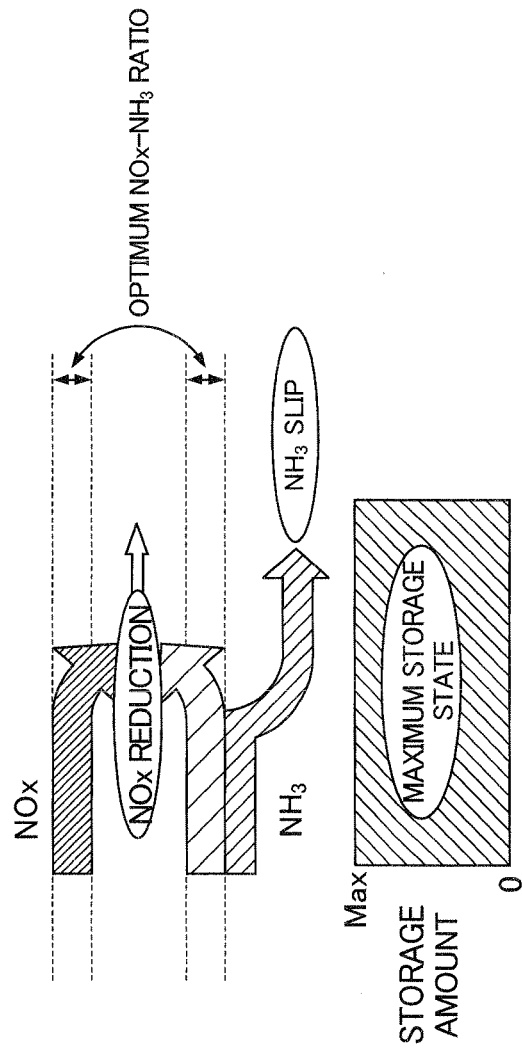
FIG. 3 is a diagram schematically showing a state in which ammonia slip occurs in the selective reduction catalyst.

FIG. 3 is a diagram schematically showing a state in which ammonia slip occurs in the selective reduction catalyst.

As shown in FIG. 3, when urea water is excessively supplied in a state in which the storage amount of the selective reduction catalyst has reached the maximum storage amount, the ammonia that does not serve in the reduction of NOx and is surplus discharges to downstream without being stored in the selective reduction catalyst.

Referring back to FIG. 1, the slip suppressing catalyst 24 is provided in the exhaust channel 11 on a downstream side of the selective reduction catalyst 23, and in a case of ammonia slip in the selective reduction catalyst 23 having occurred, suppresses the ammonia having slipped from being discharged outside the system. For example, an oxidation catalyst that oxidizes ammonia having slipped from the selective reduction catalyst 23 to break down into $N_2$ and $H_2O$, a selective reduction catalyst that stores the ammonia having slipped, or the like can be used as this slip suppressing catalyst 24.

In addition to the ammonia sensor 26, the catalyst temperature sensor 27, and the NOx sensor 28, a crank angle position sensor 14, an accelerator opening sensor 15, a urea remaining amount warning light 16, and a catalyst degradation warning light 17 are connected to the ECU 3.

The ammonia sensor 26 detects the ammonia concentration $NH3_{CONS}$ of exhaust in the exhaust channel 11 between the selective reduction catalyst 23 and the slip suppressing catalyst 24, and supplies a detection signal substantially proportional to the ammonia concentration $NH3_{CONS}$ thus detected to the ECU 3.

The catalyst temperature sensor 27 detects a temperature (hereinafter referred to as "catalyst temperature") $T_{SCR}$ of the selective reduction catalyst 23, and supplies a detection signal substantially proportional to the catalyst temperature $T_{SCR}$ thus detected to the ECU 3.

The NOx sensor 28 detects a concentration of NOx in the exhaust (hereinafter referred to as "NOx concentration") $NOX_{CONS}$ flowing into the selective reduction catalyst 23, and supplies a detection signal substantially proportional to the NOx concentration $NOX_{CONS}$ thus detected to the ECU 3.

The crank angle position sensor 14 detects a rotation angle of the crank shaft of the engine 1 along with generating a pulse at every 1° of crank angle, and supplies this pulse signal to the ECU 3. A revolution speed NE of the engine 1 is calculated by the ECU 3 based on this pulse signal. The crank angle position sensor 14 further generates a cylinder discriminating pulse at a predetermined crank angle position of a specific cylinder, and supplies this to the ECU 3.

The accelerator opening sensor 15 detects a depression amount (hereinafter referred to as "accelerator opening") AP of the accelerator pedal, which is not illustrated, of the vehicle, and supplies a detection signal substantially proportional to the accelerator opening AP thus detected to the ECU 3. A demanded torque TRQ of the engine 1 is calculated in accordance with this accelerator opening AP and revolution speed NE by the ECU 3. Hereinafter, this demanded torque TRQ is set as a load parameter representing the load of the engine 1.

The urea remaining amount warning light 16 is provided in the instrument panel of the vehicle, for example, and illuminates in response to the remaining amount of urea water in the urea tank 251 having decreased past a predetermined remaining amount. With this, the fact that the remaining amount of urea water in the urea tank 251 has decreased is warned to the operator.

The catalyst degradation warning light 17 is provided in the instrument panel of the vehicle, for example, and illuminates in response to the selective reduction catalyst 23 having been determined by a catalyst degradation determination unit 37 described later to have degraded. With this, the fact that the selective reduction catalyst is in a degraded state is warned to the operator.

The ECU 3 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition to this, the ECU 3 is provided with a storage circuit that stores every kind of calculation program executed by the CPU, calculation results, and the like, and an output circuit that outputs control signals to the engine 1, urea injection valve 253, and the like.

Next, an outline of the algorithms of catalyst degradation determination control for determining degradation of the selective reduction catalyst will be explained along with problems existing in conventional catalyst degradation determination control.

Figure 4:
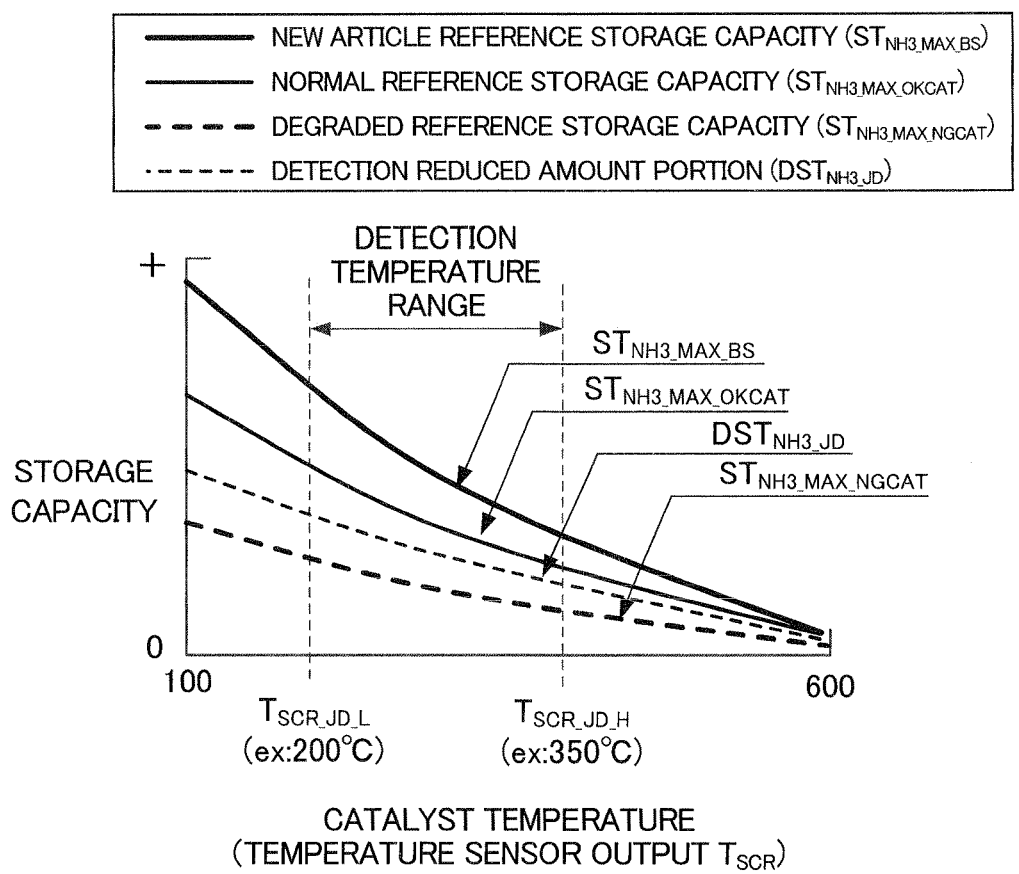
FIG. 4 is a graph schematically showing temperature characteristics of the storage capacity of the selective reduction catalyst.

FIG. 4 is a graph schematically showing the temperature characteristics of the storage capacity of the selective reduction catalyst.

In FIG. 4, the bold line shows the storage capacity of the selective reduction catalyst (hereinafter referred to as "new-article reference storage capacity") $ST_{NH3\_MAX\_BS}$ in a state of being a new article (hereinafter referred to as "new-article state"). The thin line shows the storage capacity of the selective reduction catalyst (hereinafter referred to as "normal reference storage capacity") $ST_{NH3\_MAX\_OKCAT}$ in a state that is normal and in which replacement is not required (hereinafter referred to as "normal state"). The bold dotted line shows the storage capacity of the selective reduction catalyst (hereinafter referred to as "degraded reference storage capacity") $ST_{NH3\_MAX\_NGCAT}$ in a state of having degraded to an extent that requires replacement (hereinafter referred to as "degraded state").

With the aforementioned conventional technology illustrated in Japanese Unexamined Patent Application Publication No. 2009-127496 and Japanese Unexamined Patent Application Publication No. 2007-170383, degradation of the selective reduction catalyst is determined based on the characteristics of the storage capacity, which decrease depending on the procession of such degradation.

More specifically, with the technology illustrated in Japanese Unexamined Patent Application publication No. 2009-

127496, degradation of the selective reduction catalyst is determined by continuously supplying urea water to the selective reduction catalyst, which is in a low temperature region (e.g., about 100° C.) at which NOx cannot be purified, until ammonia slip occurs, for example. However, according to this technology, although an improvement in the SN ratio in the determination of degradation can be expected by determining degradation on a selective reduction catalyst that is in a state in which the storage capacity is large, the NOx purification rate of the selective reduction catalyst during determination of degradation may decline considerably due to being in the low temperature region.

On the other hand, with the technology exemplified in Japanese Unexamined Patent Application Publication No. 2007-170383, degradation of the selective reduction catalyst is determined after the completion of regeneration of a particulate matter collection filter, i.e. from a state in which the storage amount of the selective reduction catalyst is initialized to zero, by continuously supplying urea water until ammonia slip occurs. However, according to this technology, the selective reduction catalyst when determining degradation is in a high temperature region (e.g., about 600° C.) around the combustion temperature of particulate matter; therefore, the storage capacity will remarkably decrease, as shown in FIG. 4. As a result, the degradation determination precision may decline.

Taking the above such existing problems into account, catalyst degradation determination control of the present embodiment sets a detection reduced-amount portion $DST_{NH3\_JD}$, which has the same scale as the storage capacity, to a value that is larger than a degradation reference storage capacity $ST_{NH3\_MAX\_NGCAT}$ and smaller than a normal reference storage capacity $ST_{NH3\_MAX\_OKCAT}$, as shown by the thin dotted line in FIG. 4, in order to detect the change in the storage capacity of the selective reduction catalyst without inviting for a decline in the NOx purification rate. Furthermore, a detection temperature range ($T_{SCR\_JD\_L}$, $T_{SCR\_JD\_H}$) with respect to the catalyst temperature, in which a minimum detection temperature $T_{SCR\_JD\_L}$ (e.g., 200° C.) is defined as the lower limit value and a maximum detection temperature $T_{SCR\_JD\_H}$ (e.g., 350° C.) is defined as the upper limit value, is set within a temperature range in which sufficient purification of NOx is possible in the selective reduction catalyst.

Then, the determination of degradation is initiated on a selective reduction catalyst that is in a state in which the storage amount is a maximum (state in which the storage amount and storage capacity are equal), and the catalyst temperature thereof is within the above-mentioned detection temperature range ($T_{SCR\_JD\_L}$, $T_{SCR\_JD\_H}$).

More specifically, first, the storage amount thereof is reduced in amount by the above-mentioned detection reduced-amount portion $DST_{NH3\_JD}$, by continuously setting the urea injection amount to a supply-deficient state (refer to (c) of FIG. 2).

Thereafter, the storage amount is increased in amount by continuously setting the urea injection amount to a supply-excess state (refer to (b) of FIG. 2) until it is detected that ammonia slip has occurred.

Figure 5:
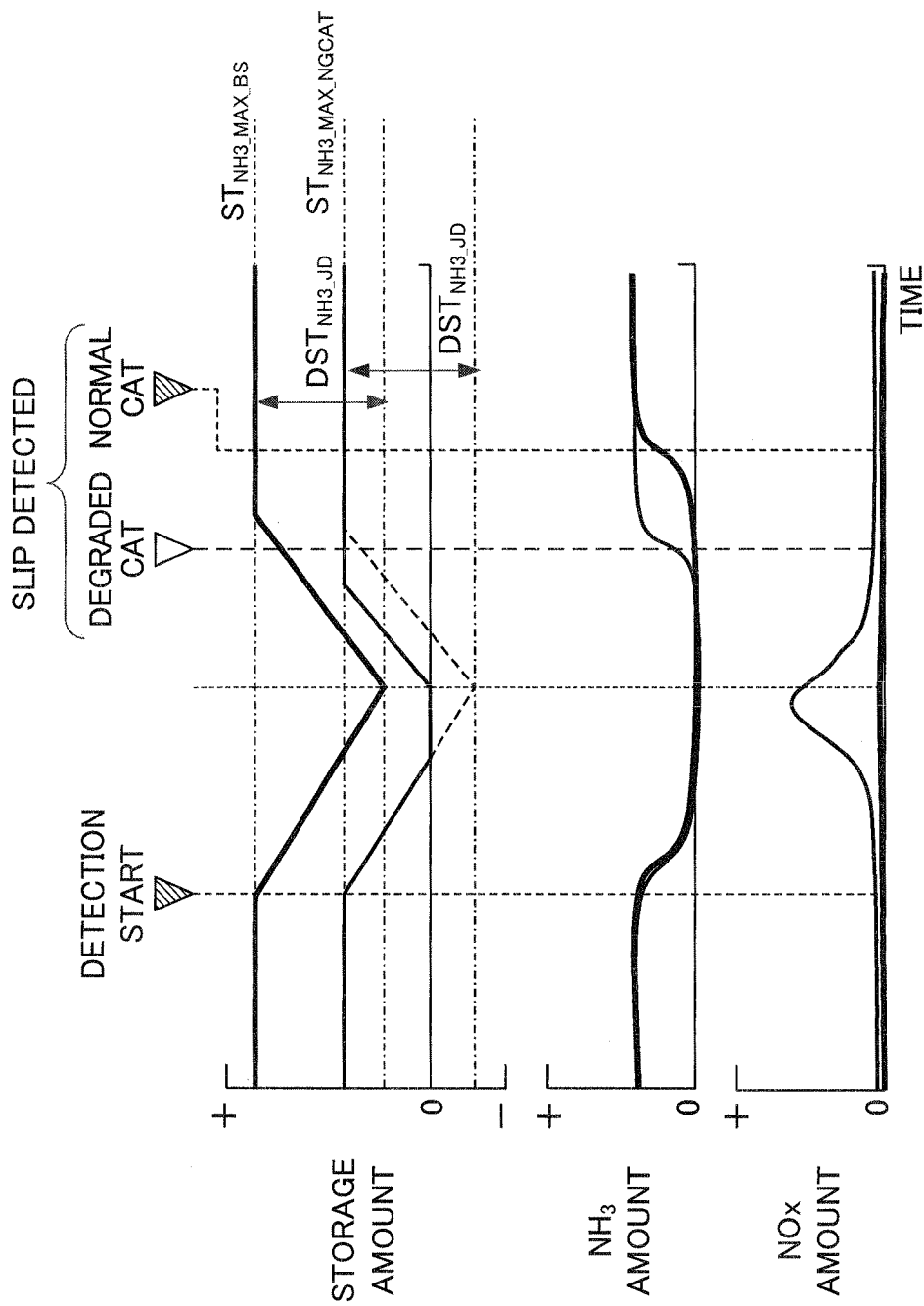
FIG. 5 presents graphs showing the changes in the storage amount of the selective reduction catalyst when the storage amount is made to fluctuate, as well as in the ammonia amount and NOx amount immediately following the selective reduction catalyst.

FIG. 5 presents graphs showing the changes in the storage amount of the selective reduction catalyst when the storage amount is made to fluctuate, as well as in the ammonia amount and NOx amount immediately following the selective reduction catalyst. In FIG. 5, the bold line shows the changes in the above-mentioned amounts when the selective reduction catalyst is in a new-article state, and the thin line shows the above-mentioned amounts when the selective reduction catalyst is in a degraded state.

At this time, since the detection reduced amount $DST_{NH3\_JD}$ is set to be less than the normal reference storage capacity $ST_{NH3\_MAX\_OKCAT}$ in a case of the selective reduction catalyst being in the new-article state or normal state, the storage amount does not become zero, even if control to reduce the storage amount is performed. Therefore, in a case of the selective reduction catalyst being in the new-article state or normal state, it is believed that the time required until detecting ammonia slip by performing control to initiate a reduction in the storage amount, and then to increase the storage amount thereafter, will always be the same.

On the other hand, in a case of the selective reduction catalyst being in a degraded state, the storage amount will become zero in the middle of performing control to reduce the storage amount, since the detection reduced-amount portion $DST_{NH3\_JD}$ is set to a value larger than the degraded reference storage capacity $ST_{NH3\_MAX\_NGCAT}$. As a result, the time required until detecting ammonia slip by performing control to initiate a reduction in the storage amount, and then to increase the storage amount thereafter is believed to become shorter than the time required until detecting ammonia slip in a case of the selective reduction catalyst being in the normal state.

Due to the above, it is possible to determine whether the selective reduction catalyst is in a degraded state based on the detection results of ammonia slip when fluctuating the storage amount by the above-mentioned detection reduced amount $DST_{NH3\_JD}$. While fluctuating the storage amount in this way, the NOx purification rate can be maintained to be high, since the storage amount does not become zero in the case of the selective reduction catalyst being in the new-article state or normal state. In addition, degradation can be determined with high precision while purifying NOx by executing such degradation determination when the selective reduction catalyst is within the above-mentioned detection temperature range.

Next, the specific configuration of the module that executes catalyst degradation determination control and urea injection control will be explained based on the above such algorithm.

Figure 6:
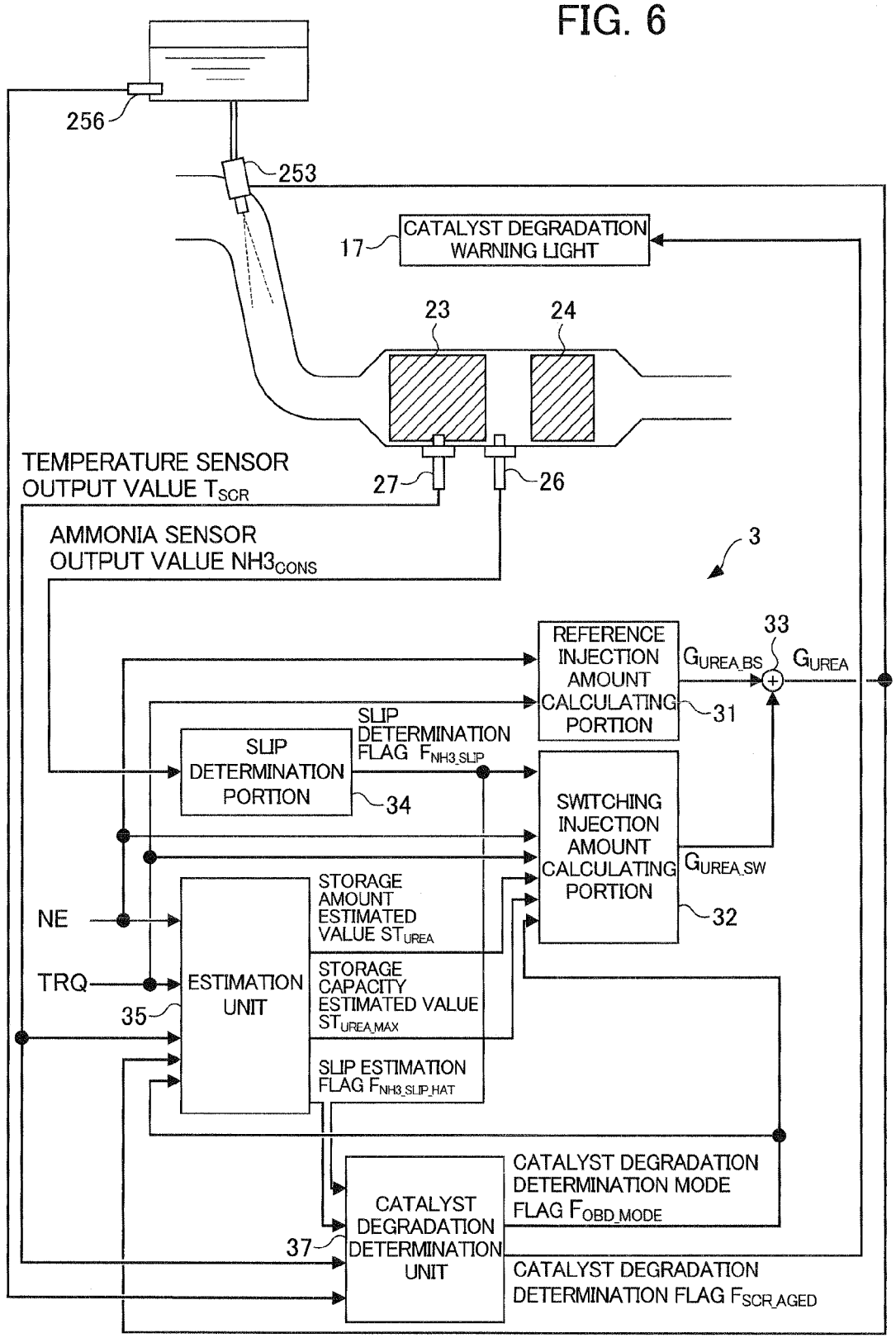
FIG. 6 is a block diagram showing a module configuration that realizes urea injection control according to the embodiment.

FIG. 6 is a block diagram showing the module configuration that executes urea injection control and catalyst degradation determination control according to the present embodiment. These functions are realized by the ECU 3, which includes the aforementioned such hardware configuration.

With the urea injection control of the present embodiment, a reference injection amount $G_{UREA\_BS}$ to be the reference relative to the overall injection amount is calculated by the reference injection amount calculating portion 31 described later, and an corrected amount of this reference injection amount $G_{UREA\_BS}$, by adding by way of an adder 33 the switching injection amount $G_{UREA\_SW}$ calculated by the switching injection amount calculating portion 32 described later to this reference injection amount $G_{UREA\_BS}$, is determined as the urea injection amount $G_{UREA}$ (refer to the follow formula (1)).

$$G_{UREA}(k) = G_{UREA\_BS}(k) + G_{UREA\_SW}(k) \quad (1)$$

Herein, the notation (k) is a notation expressing computing time set synchronously with a urea injection cycle (e.g., 0.25 to 3.00 seconds). In other words, in a case of $G_{UREA}(k)$ being a urea injection amount in a current control timing, for example, $G_{UREA}(k-1)$ indicates being a urea injection amount in a control timing one cycle previous (previous time). It should be noted that the notation (k) is omitted as appropriate in the following explanation.

Hereinafter, detailed configurations of the slip determination portion 34, reference injection amount calculating portion 31, estimation unit 35, switching injection amount calculation portion 32, and catalyst degradation determination unit 37 will be explained in order.

Configuration of Slip Determination Portion

Figure 7:
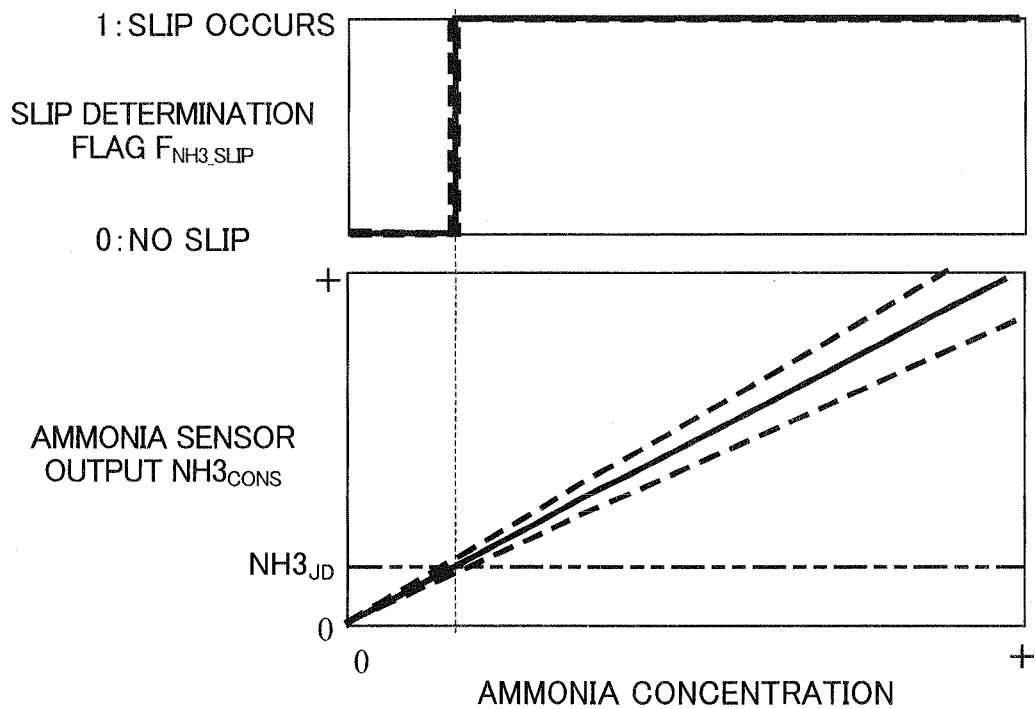
FIG. 7 presents graphs showing the output characteristics of an ammonia sensor, and the behavior of a slip determination portion under this ammonia sensor according to the embodiment.

FIG. 7 presents graphs showing the output characteristics of an ammonia sensor 26 (bottom), and the behavior of the slip determination portion under this ammonia sensor (top).

As shown at the bottom of FIG. 7, the ammonia sensor 26 outputs a detection signal $NH3_{CONS}$ of a level substantially proportional to the ammonia concentration of the exhaust; however, the present ammonia sensor 26 is affected by components other than ammonia in the exhaust (e.g., $O_2$ and $H_2O$), and there is a possibility for gain variation to occur as shown by the dotted line. As a result, in a case of performing urea injection control based on the output value of the ammonia sensor 26, the urea injection amount may deviate from the optimum amount depending on the gain variation of the ammonia sensor 26, and the determination precision of degradation of the selective reduction catalyst may decline. Therefore, with this urea injection control as explained in detail below, in order to perform stable control irrespective of the gain variation of the ammonia sensor 26, a signal is used that was formed by converting the output of the ammonia sensor 26 to a binary signal by way of the slip determination portion 34.

The slip determination portion 34 determines the existence of ammonia slip downstream of the selective reduction catalyst, i.e. occurrence of ammonia slip of the selective reduction catalyst, based on the output value $NH3_{CONS}$ of the ammonia sensor 26, and determines a slip determination flag $F_{NH3\_SLIP}$ indicating being a state in which ammonia slip has occurred. More specifically, as shown in FIG. 3, in a case of setting a threshold value $NH3_{JD}$ for the output value $NH3_{CONS}$ of the ammonia sensor to near a value 0, and the output value $NH3_{CONS}$ being smaller than the threshold value $NH3_{JD}$, the ammonia slip is determined to not be occurring, and the slip determination flag $F_{NH3\_SLIP}$ is set to "0", and in a case of the output value $NH3_{CONS}$ being at least the threshold value $NH3_{JD}$, ammonia slip is determined to be occurring, and the slip determination flag $F_{NH3\_SLIP}$ is set to "1" (refer to the following formula (2)).

$$F_{NH3\_SLIP} = \begin{cases} 1: & NH_3 \text{ SLIP OCCURS}(NH3_{CONS} \geq NH3_{JD}) \\ 0: & NO\ NH_3\ SLIP(NH3_{CONS} < NH3_{JD}) \end{cases} \quad (2)$$

The error in the output value $NH3_{CONS}$ of the ammonia sensor becomes larger depending on the absolute value of the output value $NH3_{CONS}$, along with gain variation of the ammonia sensor. With this slip determination portion 34, it is possible to stably determine the occurrence of ammonia slip with high precision, irrespective of the gain variation of the ammonia sensor, by setting the threshold value $NH3_{JD}$ for the output value $NH3_{CONS}$ to near the value 0 at which the error is small.

Configuration of Reference Injection Amount Calculating Portion

Herein, for the ammonia amount necessary to reduce all of the NOx discharged from the engine, the ratio of the urea water amount necessary to generate this ammonia amount to the urea water amount actually injected is called the urea water equivalence ratio. In other words, the aforementioned optimum state shown in (a) of FIG. 2 refers to a state in which the urea water equivalence ratio is "1".

Figure 8:
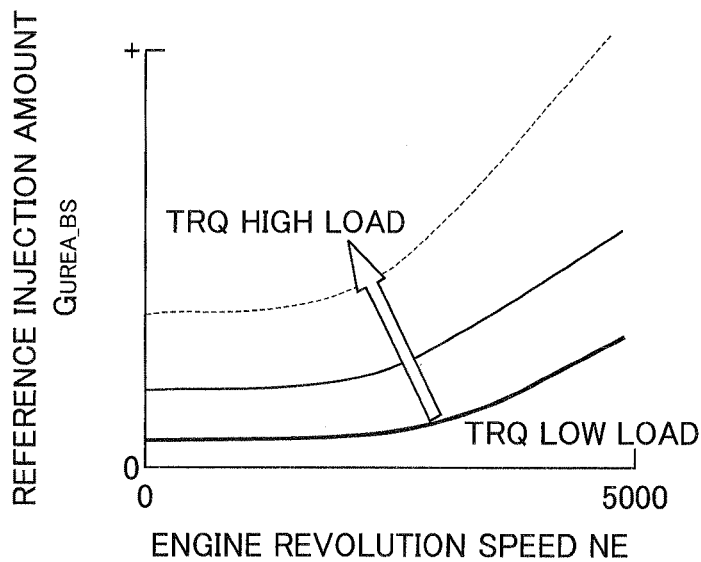
FIG. 8 is a graph showing an example of a control map for determining a reference injection amount according to the embodiment.

In order to inject urea water of an amount appropriate for the NOx amount that is discharged from the engine, the reference injection amount calculating portion 31 calculates the reference injection amount $G_{UREA\_BS}$ so as to make the urea water equivalence ratio "1". More specifically, the reference injection amount calculating portion 31 calculates the reference injection amount $G_{UREA\_BS}$ by searching a predetermined control map, for example, based on a certain parameter correlated to an operating state of the engine, such as the engine revolution speed NE or a load parameter TRQ of the engine (refer to the following formula (3)).

$$G_{UREA\_BS}(k) \leftarrow \text{calculated by searching the map shown in FIG. 8, based on the engine load } TRQ \\ (k) \text{ and engine revolution speed } NE(k) \quad (3)$$

FIG. 8 is a graph showing an example of a control map for determining the reference injection amount $G_{UREA\_BS}$.

As shown in FIG. 8, with this control map, the reference injection amount $G_{UREA\_BS}$ is determined to be a larger value accompanying the revolution speed NE of the engine or the load parameter TRQ increasing.

This is because the NOx emission amount increases by the combustion temperature of the air/fuel mixture rising with the load parameter TRQ of the engine increasing, and the NOx emission amount increases per unit time with the revolution speed NE of the engine rising. It should be noted that the fuel injection amount or the amount of new air in the cylinder may be used as the load parameter of the engine.

It should be noted that, in a case of having provided a NOx sensor that detects the NOx concentration of exhaust flowing into the selective reduction catalyst, as shown in FIG. 1, the reference injection amount $G_{UREA\_BS}$ may be calculated based on the output value $NOX_{CONS}$ of this NOx sensor as the parameter correlated to the operating state of the engine.

Configuration of Estimation Unit

With the estimation unit 35, an estimated value $ST_{NH3}$ of the storage amount of the selective reduction catalyst and the estimated value $ST_{NH3\_MAX}$ of the storage capacity of the selective reduction catalyst are calculated, and further, a slip estimation flag $F_{NH3\_SLIP\_HAT}$ to estimate the occurrence of ammonia slip in the selective reduction catalyst is determined based on these estimated values $ST_{NH3}$ and $ST_{NH3\_MAX}$.

Incidentally, in addition to the ammonia generated from urea water by way of hydrolysis, that adhered in the form of urea water is also included as the ammonia stored in the selective reduction catalyst. Therefore, the estimated values $ST_{NH3}$ and $ST_{NH3\_MAX}$ of the storage amount and storage capacity of the selective reduction catalyst, respectively, are equally treated with the scale of urea water amount (g).

With the catalyst degradation determination unit 37 described later, a reference parameter is calculated based on the slip estimation flag $F_{NH3\_SLIP\_HAT}$ calculated by the estimation unit 35, and the actual degradation of the selective reduction catalyst is determined by comparing this reference parameter with the slip determination flag $F_{NH3\_SLIP}$ calculated by the slip determination portion 34. In other words, the estimated values $ST_{NH3}$ and $ST_{NH3\_MAX}$ and the slip estimation flag $F_{NH3\_SLIP\_HAT}$ calculated by the estimation unit 35 become references of the catalyst degradation determination unit 37 for detecting the actual state of the selective reduction catalyst. As a result, with the estimation unit 35, the state of the selective reduction catalyst is fixed to a predetermined reference state, and the storage capacity and storage amount of the selective reduction catalyst in this reference state are estimated. Although this new-article state has been explained as a reference state in the present embodiment, it is not limited thereto. For example, the normal state or another state may be set as the reference state.

As shown in the follow formula (4), the storage capacity of the selective reduction catalyst in the new-article state is used for the estimated value $ST_{NH3\_MAX}$ of the storage capacity.

$$ST_{NH3\_MAX}(k) = ST_{NH3\_MAX\_BS}(k) \qquad (4)$$

Figure 9:
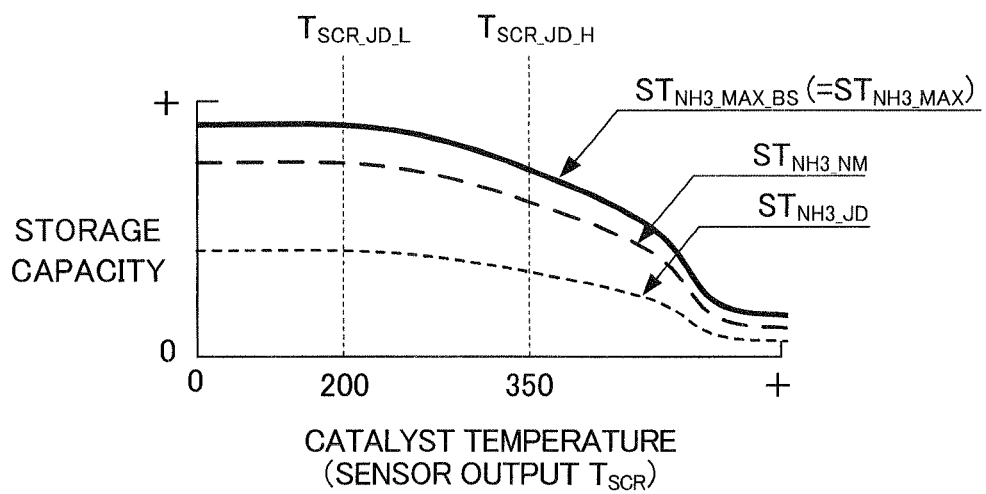
FIG. 9 is a graph showing an example of a control map for determining a new-article reference storage capacity.

In addition, this new-article reference storage capacity $ST_{NH3\_MAX\_BS}$ is calculated by searching a predetermined control map based on the output value $T_{SCR}$ of the temperature sensor (refer to the following formula (5)).

$$ST_{NH3\_MAX\_BS}(k) \leftarrow \text{calculated by searching the map} \\ \text{shown in FIG. 9, based on the output value } T_{SCR} \\ \text{of catalyst temperature sensor} \qquad (5)$$

FIG. 9 is a graph showing an example of a control map for determining the new-article reference storage capacity $ST_{NH3\_MAX\_BS}$. As shown in FIG. 9, the new-article reference storage capacity $ST_{NH3\_MAX\_BS}$ is determined with this control map so as to become smaller with the catalyst temperature rising according to the characteristics of the selective reduction catalyst.

The estimated value $ST_{NH3}$ of the storage amount is calculated in the following sequence.

First, among the ammonia generated by injection from the urea injection device and hydrolysis, a portion not contributing to the reduction of NOx is stored in the selective reduction catalyst (refer to (b) of FIG. 2) Therefore, ammonia corresponding to an amount arrived at by subtracting the reference injection amount $G_{UREA\_BS}$ (k) from the overall urea injection amount $G_{UREA}$ (k) is stored in the selective reduction catalyst in a current control time. In addition, there is a lower limit value (value 0) and an upper limit value (storage capacity) for the amount of ammonia stored in the selective reduction catalyst. Therefore, as shown in the following formula (6), a first temporal value $ST_{NH3\_TEMP1}$ (k) of the storage amount estimated value is calculated by adding a current stored portion ($G_{UREA}$ (k)–$G_{UERA\_BS}$ (k)) to a previous value $ST_{NH3}$ (k–1) of the storage amount estimated value, and further, as shown in the following formula (7), a second temporal value $ST_{NH3\_TEMP2}$ (k) of the storage amount estimated value is calculated by conducting limit processing of an upper limit value and a lower limit value on this first temporal value $ST_{NH3\_TEMP1}$ (k).

$$ST_{NH3\_TEMP1}(k) = ST_{NH3}(k-1) + G_{UREA}(k) - G_{UREA\_BS}(k) \qquad (6)$$

$$ST_{NH3\_TEMP2}(k) = \begin{cases} ST_{NH3\_MAX}(k) & (ST_{NH3\_MAX}(k) \leq ST_{NH3\_TEMP1}(k)) \\ ST_{NH3\_TEMP1}(k) & (0 < ST_{NH3\_TEMP1}(k) < ST_{NH3\_MAX}(k)) \\ 0 & (ST_{NH3\_TEMP1}(k) \leq 0) \end{cases} \qquad (7)$$

The second temporal value $ST_{NH3\_TEMP2}$ calculated in the above way may have cumulative error generated from being a value obtained by adding the stored portion ($G_{UREA}$–$G_{UREA\_BS}$) of the entire urea injection amount $G_{UREA}$ for every control cycle. Therefore, a value obtained by conducting reset processing such as that shown in the following formula (8) on this second temporal value $ST_{NH3\_TEMP2}$ is used for the estimated value $ST_{NH3}$ of the storage amount. In other words, in a case in which the slip determination flag $F_{NH3\_SLIP}$, which indicates being a state in which ammonia slip occurs, is "1" and the catalyst degradation determination mode flag $F_{OBD\_MODE}$ described later is "0", the second temporal value $ST_{NH3\_TEMP2}$ is reset to $ST_{NH3\_MAX}$.

$$ST_{NH3}(k) = \begin{cases} ST_{NH3\_TEMP2}(k) & (F_{NH3\_SLIP} = 1 \text{ and } F_{OBD\_MODE} = 1) \\ ST_{NH3\_MAX}(k) & (F_{NH3\_SLIP} = 1 \text{ and } F_{OBD\_MODE} = 0) \\ ST_{NH3\_TEMP2}(k) & (F_{NH3\_SLIP} = 0) \end{cases} \qquad (8)$$

The slip estimation flag $F_{NH3\_SLIP\_HAT}$ to estimate the occurrence of ammonia slip is reset to "1" from "0" in response to the estimated value $ST_{NH3}$ of the storage amount having become at least the estimated value $ST_{NH3\_MAX}$ of the storage capacity, as shown in the following formula (9).

$$F_{NH3\_SLIP\_HAT}(k) = \begin{cases} 1: & ST_{NH3}(k) \geq ST_{NH3\_MAX}(k) \\ 0: & ST_{NH3}(k) < ST_{NH3\_MAX}(k) \end{cases} \qquad (9)$$

Configuration of Switching Injection Amount Calculating Portion

With the switching injection amount calculating portion 32, the switching injection amount $G_{UREA\_SW}$ to be the correction amount relative to the reference injection amount $G_{UREA\_BS}$ is calculated in order to inject urea water of an amount appropriate for keeping the storage amount of the selective reduction catalyst near the storage capacity. More specifically, the switching injection amount calculating portion 32 calculates the switching injection amount $G_{UREA\_SW}$ based on the slip determination flag $F_{NH3\_SLIP}$, storage amount estimated value $ST_{NH3}$, storage capacity estimated value $ST_{NH3\_MAX}$, and catalyst degradation determination mode flag $F_{OBD\_MODE}$.

With this switching injection amount calculating portion 32, a switch storage amount target value $ST_{NH3\_SW}$ described later is set to a value that is smaller than the estimated value $ST_{NH3\_MAX}$ of the storage capacity in order to keep the storage amount of the selective reduction catalyst near the storage capacity thereof. Then, the switching injection amount $G_{UREA\_SW}$ is calculated so that the estimated value $ST_{NH3}$ of the storage amount falls between this estimated value $ST_{NH3\_MAX}$ of the storage capacity and the switch storage amount target value $ST_{NH3\_SW}$.

First, a sequence of setting the switch storage amount target value $ST_{NH3\_SW}$ will be explained.

In the present embodiment, the storage amount of the selective reduction catalyst is controlled so as to fluctuate when determining degradation of the catalyst in the aforementioned way, the switch storage amount target value $ST_{NH3\_SW}$ is set so as to be different between during normal control in which the catalyst degradation determination mode flag $F_{OBD\_MODE}$ is set to "0", and during degradation determination in which the catalyst degradation determination mode flag $F_{OBD\_MODE}$ is set to "1". More specifically, as shown in the following formula (10), during normal control, the switch storage amount target value $ST_{NH3\_SW}$ is set to a predetermined storage amount target value $ST_{NH3\_NM}$ for normal control. In addition, during degradation control, the switch storage amount target value $ST_{NH3\_SW}$ is set to a storage amount target value $ST_{NH3\_JD}$ for degradation determination, which is a value smaller than the above-mentioned storage amount target value $ST_{NH3\_NM}$ for normal control.

$$ST_{NH3\_SW}(k) = \begin{cases} ST_{NH3\_NM}(k) & (F_{OBD\_MODE}(k) = 0) \\ ST_{NH3\_JD}(k) & (F_{OBD\_MODE}(k) = 1) \end{cases} \quad (10)$$

$$ST_{NH3\_NM}(k) > ST_{NH3\_JD}(k) \quad (11)$$

Herein, the storage amount target value $ST_{NH3\_NM}$ for normal control is calculated by multiplying a temperature coefficient KSTSW by the storage capacity estimated value $ST_{NH3\_MAX}$ as shown in the following formula (12), so as to be a value somewhat smaller than the storage capacity estimated value $ST_{NH3\_MAX}$.

$$ST_{NH3\_NM}(k) = KSTSW(k)ST_{NH3\_MAX}(k) \quad (12)$$

Figure 10:
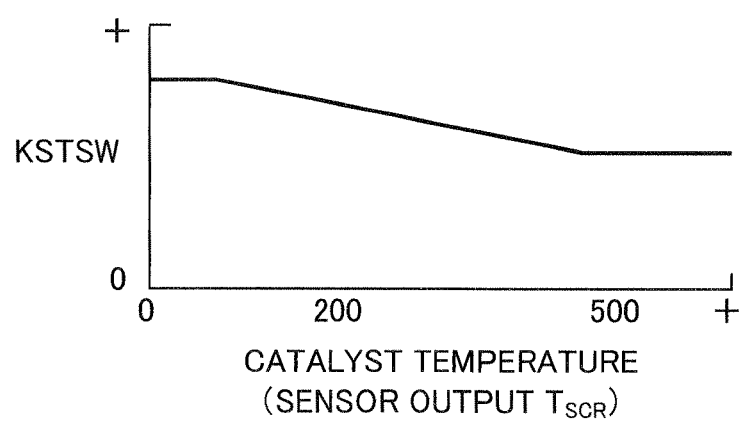
FIG. 10 is a graph showing an example of a control map for determining a temperature coefficient according to the embodiment.

In addition, this temperature coefficient KSTSW is calculated by searching a control map such as that shown in FIG. 10 based on the output value $T_{SCR}$ of the catalyst temperature sensor (refer to the following formula (13)). As shown in FIG. 10, this temperature coefficient KSTSW is preferably defined between 0 and 1 so as to increase in a temperature range in which the storage capacity is large, and so as to decrease in a temperature range in which the storage capacity is small.

$KSTSW(k)$←calculated by searching the map shown in
   FIG. 10, based on the output value $T_{SCR}$ of cata-
   lyst temperature sensor (13)

With this, it is set so that the difference between the estimated value $ST_{NH3\_MAX}$ of the storage capacity and the switch storage amount target value $ST_{NH3\_SW}$ decreases with the catalyst temperature rising, as shown by the dotted lines in FIG. 9. As a result, it is possible to continuously maintain a state in which the storage amount is close to the storage capacity for a selective reduction catalyst in which the storage capacity declines with catalyst temperature rising.

It should be noted that the above-mentioned temperature coefficient KSTSW may be made constant irrespective of the output value $T_{SCR}$ of the temperature sensor. In addition, not being limiting to the above-mentioned formula (12), the storage amount target value $ST_{NH3\_NM}$ for normal control may be set by subtracting a predetermined value from the estimated value $ST_{NH3\_MAX}$ of the storage capacity.

On the other hand, the storage amount target value $ST_{NH3\_JD}$ for degradation determination is calculated by subtracting the aforementioned detection reduced-amount portion $DST_{NH3\_JD}$ from the estimated value $ST_{NH3\_MAX}$ of the storage capacity, as shown in the following formula (14)

$$ST_{NH3\_JD}(k)ST_{NH3\_MAX}(k) - DST_{NH3\_JD}(k) \quad (14)$$

According to the above, the storage amount target value $ST_{NH3\_NM}$ for normal control is set to a value that is somewhat smaller than the estimated value $ST_{NH3\_MAX}$ of the storage capacity, and the storage amount target value $ST_{NH3\_JD}$ for degradation determination is set to a value that is smaller than the storage amount target value $ST_{NH3\_NM}$ for normal control, as shown in FIG. 9.

Next, an injection amount switching flag $F_{UREA\_SW}$ is determined based on the estimated value $ST_{NH3}$ of the storage amount, the switch storage amount target value $ST_{NH3\_SW}$, and the slip determination flag $F_{NH3\_SLIP}$, as shown in the following formula (15).

In other words, the injection amount switching flag $F_{UREA\_SW}$ is set to "1" from "0" in response to ammonia slip occurring in the selective reduction catalyst, and the slip determination flag $F_{NH3\_SLIP}$ having become "1" from "0".

Thereafter, the injection amount switching flag $F_{UREA\_SW}$ is reset to "0" from "1" in response to the estimated value $ST_{NH3}$ of the storage capacity having fallen below the above-mentioned switch storage amount target value $ST_{NH3\_SW}$.

$$F_{UREA\_SW}(k) = \quad (15)$$
$$\begin{cases} 1: F_{NH3\_SLIP}(k) = 1 \text{ and } F_{UREA\_SW}(k-1) = 0 \\ 0: ST_{NH3}(k) \leq ST_{NH3\_SW}(k) \text{ and } F_{UREA\_SW}(k-1) = 1 \\ F_{UREA\_SW}(k-1): \text{ OTHER CONDITIONS} \end{cases}$$

The switching injection amount $G_{UREA\_SW}$ is calculated as shown in the following formula (16), according to the injection amount switching flag $F_{UREA\_SW}$ determined in the above way.

In other words, in a case of the injection amount switching flag $F_{UREA\_SW}$ being "1", the injection amount of urea water is determined to be a slightly excessive state, and the product of multiplying the exhaust density $DEN_{EX}$ and the estimated value $V_{EX}$ of the exhaust volume by a negative predetermined supply-excess time correction value $G_{UREA\_SW\_UND}$ is determined as the switching injection amount $G_{UREA\_SW}$.

Then, in a case of the injection amount switching flag $F_{UREA\_SW}$ being "0", the injection amount of urea water is determined to be a slightly insufficient state, and the product of multiplying the exhaust density $DEN_{EX}$ and the estimated value $V_{EX}$ of the exhaust volume by a positive predetermined supply-deficient time correction value $G_{UREA-SW\_OVD}$ is determined as the switching injection amount $G_{UREA\_SW}$.

$$G_{UREA\_SW}(k) = \begin{cases} G_{UREA\_SW\_UND} DEN_{EX} V_{EX}(k): F_{UREA\_SW}(k) = 1 \\ G_{UREA\_SW\_OVD} DEN_{EX} V_{EX}(k): F_{UREA\_SW}(k) = 0 \end{cases} \quad (16)$$

$G_{UREA\_SW\_UND}$: SUPPLY-EXCESS TIME
   CORRECTION VALUE ($G_{UREA\_SW\_UND} < 0$)

$G_{UREA\_SW\_OVD}$: SUPPLY-DEFICIENT TIME
   CORRECTION VALUE ($G_{UREA\_SW\_OVD} > 0$)

$DEN_{EX}$: EXHAUST DENSITY (g/L)

With this, the urea injection amount $G_{UREA}$ is reduced in amount from the reference injection amount $G_{UREA\_BS}$ in response to having determined that ammonia slip has occurred, and the supply-deficient state shown in (c) of FIG. 2 is entered. Thereafter, the urea injection amount $G_{UREA}$ is increased in amount from the reference injection amount $G_{UREA\_BS}$ in response to the estimated value $ST_{NH3}$ of the storage capacity falling below the switch storage amount target value $ST_{NH3\_SW}$, and the supply-excess state shown in (b) of FIG. 2 is entered.

Herein, the estimated value $V_{EX}$ of the exhaust volume is calculated by searching a predetermined control map, for example, based on the engine revolution speed NE or the load parameter TRQ (refer to the following formula (17)). As this control map for calculating the estimated value $V_{EX}$ of the exhaust volume, the map shown in FIG. 11 is used, for example.

Figure 11:
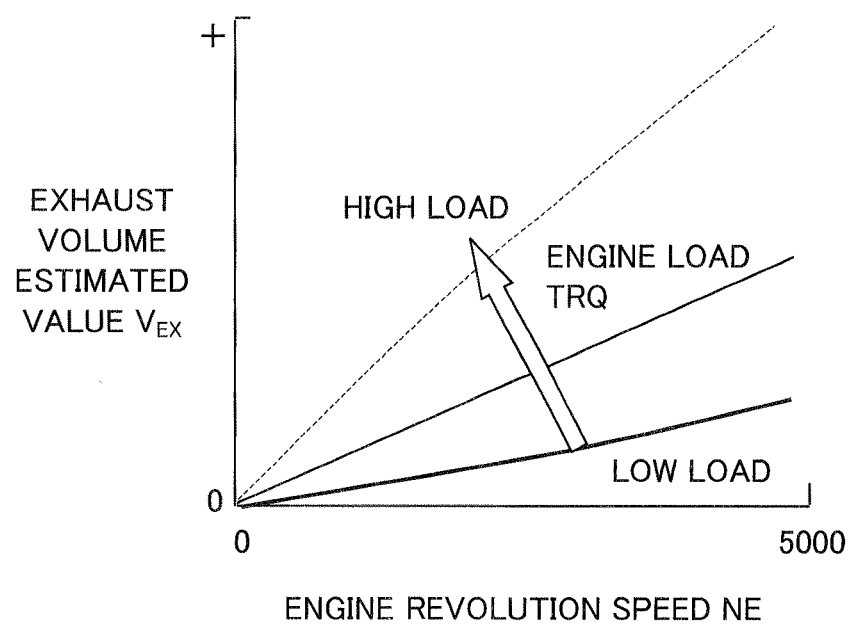
FIG. 11 is a graph showing an example of a control map for determining an estimated value of the exhaust volume according to the embodiment.

$V_{EX}(k)$←calculated by searching the map shown in
   FIG. 11, based on the engine load $TRQ(k)$ and
   the engine revolution peed $NE(k)$ (17)

Figure 12:
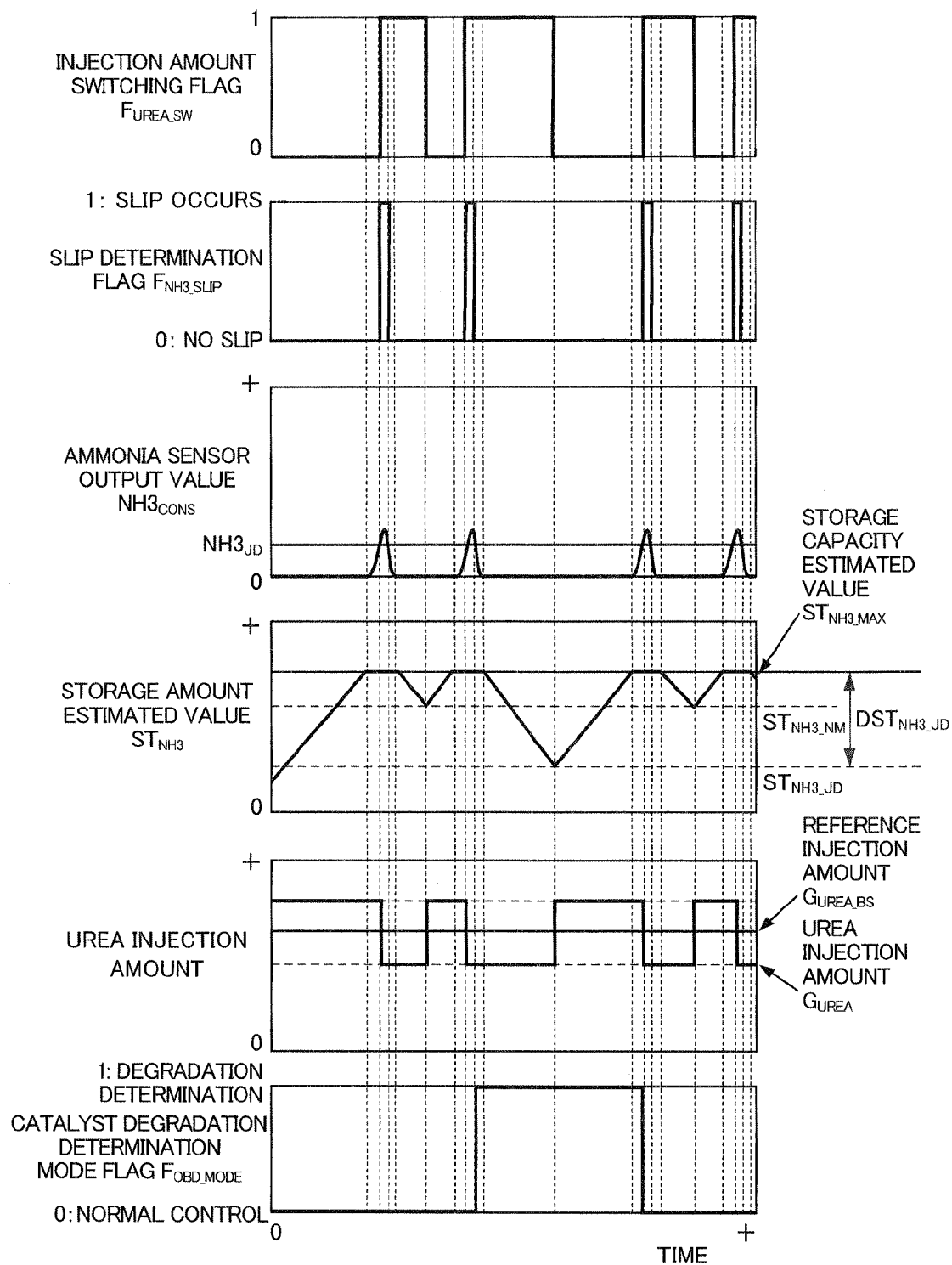
FIG. 12 presents time charts showing behavior of an injection amount switching flag, slip determination flag, ammonia sensor output value, storage amount estimated value, storage capacity estimated value, and urea injection amount.

FIG. 12 presents time charts showing the behavior of the injection amount switching flag $F_{UREA\_SW}$, slip determination flag $F_{NH3\_SLIP}$, ammonia sensor output value $NH3_{CONS}$, storage amount estimated value $ST_{NH3}$, storage capacity estimated value $ST_{NH3\_MAX}$, and urea injection amount $G_{UREA}$. In FIG. 12, a case is shown in which the engine operating state is made constant, and the amount of NOx discharged from the engine is made constant.

Operation is started from a state in which ammonia is not being stored in the selective reduction catalyst.

Immediately after operation of the engine has been started, the slip determination flag $F_{NH3\_SLIP}$ and the injection amount switching flag $F_{UREA\_SW}$ are "0", and thus the switching injection amount $G_{UREA\_SW}$ is set to a positive value. As a result, the urea injection amount $G_{UREA}$ becomes an amount correcting the reference injection amount $G_{UREA\_BS}$ to the increased amount side.

Thereafter, the estimated value $ST_{NH3}$ of the storage amount increases, and when it reaches the estimated value $ST_{NH3\_MAX}$ of the storage capacity, the output value $NH3_{CONS}$ of the ammonia sensor begins to increase. Ammonia slip is determined to have occurred and the slip determination flag $F_{NH3\_SLIP}$ is set to "1" in response to the output value $NH3_{CONS}$ of the ammonia sensor having exceeded the threshold value $NH3_{JD}$. At this time, the injection amount switching flag $F_{UREA\_SW}$ is set to "1" while the switching injection amount $G_{UREA\_SW}$ is simultaneously set to a negative value. With this, the urea injection amount $G_{UREA}$ becomes an amount correcting the reference injection amount $G_{UREA\_BS}$ to the reduced amount side.

By correcting the urea injection amount $G_{UREA}$ to the reduced amount side, the ammonia sensor output value $NH3_{CONS}$ begins to decrease. In response to having determined that the ammonia sensor output value $NH3_{CONS}$ has fallen below the threshold value $NH3_{JD}$, it is determined that the ammonia slip has come down, and the slip determination flag $F_{NH3\_SLIP}$ is reset to "0".

Thereafter, in response to having determined that the estimated value $ST_{NH3}$ of the storage amount has begun to decrease from the storage capacity estimated value $ST_{NH3\_MAX}$, and the estimated value $ST_{NH3}$ of the storage amount having fallen below the switch storage amount target value $ST_{NH3\_SW}$, the injection amount switching flag $F_{UREA\_SW}$ is reset to "0" and the switching injection amount $G_{UREA\_SW}$ is set again to a positive value. With this, the urea injection amount $G_{UREA}$ becomes an amount correcting the reference injection amount $G_{UREA\_BS}$ to the increased amount side.

More specifically, in the above way, with the urea injection control of the present embodiment, the urea injection amount $G_{UREA}$ is alternately corrected to the increased amount side and reduced amount side relative to the reference injection amount $G_{UREA\_BS}$ so that the storage amount estimated value $ST_{NH3}$ oscillates between the storage capacity estimated value $ST_{NH3\_MAX}$ and the switch storage amount target value $ST_{NH3\_SW}$.

In the aforementioned way, the switch storage amount target value $ST_{NH3\_SW}$ is set to the storage amount target value $ST_{NH3\_NM}$ for normal control in a case of the catalyst degradation determination mode flag $F_{OBD\_MODE}$ being "0", and the switch storage amount target value $ST_{NH3\_SW}$ is set to the storage amount target value $ST_{NH3\_JD}$ for degradation determination in a case of the catalyst degradation determination mode flag $F\_{OBD\_MODE}$ being "1". Therefore, as shown in FIG. 12, the storage amount of the selective reduction catalyst is controlled so as to oscillate near the storage capacity estimated value $ST_{NHD\_MAX}$ during normal control, in which the catalyst degradation determination mode flag $F_{OBD\_MODE}$ is set to "0". In addition, the storage amount of the selective reduction catalyst is controlled so as to fluctuate by the above-mentioned detection reduced-amount portion $DST_{NH3\_JD}$ from the storage capacity estimated value $ST_{NH3\_MAX}$ during degradation determination, in which the catalyst degradation determination mode flag $F\_{OBD\_MODE}$ is set to "1".

Configuration of Catalyst Degradation Determination Unit

The catalyst degradation determination unit 37 determines the degradation of the selective reduction catalyst based on output results of the slip determination flag $F_{NH3\_SLIP}$ when the storage amount of the selective reduction catalyst is made to fluctuate in the aforementioned way. Hereinafter, a detailed sequence thereof will be explained.

First, based on the following formula (18), the catalyst degradation determination unit 37 determines the catalyst degradation determination mode flag $F_{OBD\_MODE}$ which indicates being in the course of degradation determination.

In other words, the catalyst degradation determination mode flag $F_{OBD\_MODE}(k)$ is set to "1" from "0" in response to all of the conditions being satisfied among: a predetermined time has elapsed since ammonia slip initially occurred (since the slip determination flag $F_{NH3\_SLIP}$ became "1"), the output value $T_{SCR}(k)$ of the catalyst temperature sensor is within the detection temperature range ($T_{SCR\_JD\_L}$, $T_{SCR\_JD\_H}$), a concentration determination flag $F_{UREA\_CONS\_OK}(k)$ described later is "1", a determination completion flag $F_{OBD\_DONE}(k)$ described later is "1", a slip determination flag $F_{NH3\_SLIP}(k)$ is "1", and a previous value of the catalyst degradation determination mode flag $F_{OBD\_MODE}(k-1)$ is "0". It should be noted that, although the above-mentioned predetermined time is set to 5 seconds, for example, it is not limited thereto. For example, it may be 0 seconds.

In addition, after the catalyst degradation determination mode flag $F_{OBD\_MODE}(k)$ has been set to "1" from "0", it is reset to "0" in response to the slip determination flag $F_{NH3\_SLIP}(k)$, slip estimation flag $F_{NH3\_SLIP\_HAT}(k)$, and previous value of the catalyst degradation determination mode flag $F_{OBD\_MODE}(k-1)$ all having become "1".

$$F_{OBD\_MODE}(k) = \qquad (18)$$

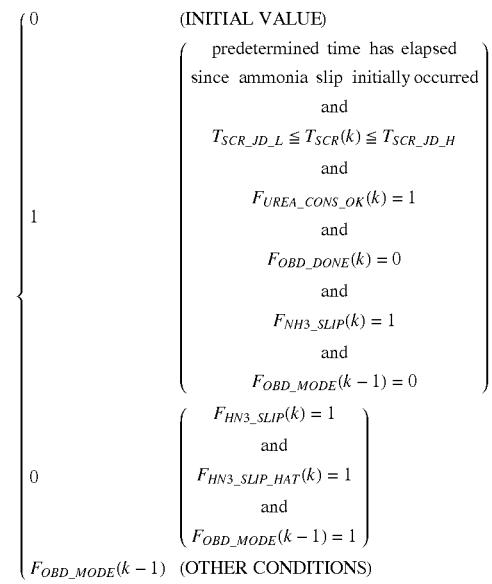

Herein, the concentration determination flag $F_{UREA\_CONS\_OK}$ in the above formula (18) is a flag indicating that the concentration of the urea water stored in the urea tank is in a normal state, and is determined based on the output value of the urea concentration sensor by way of processing that is not illustrated.

In addition, the determination completion flag $F_{OBD\_DONE}$ in the above formula (18) is a flag that indicates being in a state after completion of the determination of degradation of the catalyst, and is determined based on the following formula (19). In other words, the determination completion flag $F_{OBD\_DONE}$ (k) is set to "1" in response to the slip determination flag $F_{NH3\_SLIP}$ (k), slip estimation flag $F_{NH3\_SLIP\_HAT}$ (k) and previous value of the catalyst degradation determination mode flag $F_{OBD\_MODE}$ (k−1) all having become "1".

$$F_{OBD\_DONE}(k) = \begin{cases} 0 & \text{(INITIAL VALUE)} \\ 1 & \begin{pmatrix} F_{NH3\_SLIP}(k) = 1 \\ \text{and} \\ F_{NH3\_SLIP\_HAT}(k) = 1 \\ \text{and} \\ F_{OBD\_MODE}(k-1) = 1 \end{pmatrix} \\ F_{OBD\_DONE}(k-1) & \text{(OTHER CONDITIONS)} \end{cases} \quad (19)$$

The catalyst degradation determination flag $F_{SCR\_AGED}$ which indicates that the selective reduction catalyst is in a degraded state, is determined based on the output results of the slip determination flag $F_{NH3\_SLIP}$ when the storage amount is made to fluctuate in the aforementioned way in accordance with setting the catalyst degradation determination mode flag $F_{OBD\_MODE}$ to "1" from "0". Hereinafter, the detailed sequence thereof will be explained. It should be noted that several variations are considered for specific sequences to determine the catalyst degradation determination flag $F_{SCR\_AGED}$ based on the output results of the slip determination flag $F_{NH3\_SLIP}$. Hereinafter, specific sequences of the four variations of TYPE 1, TYPE 2, TYPE 3, and TYPE 4 will be explained.

Type 1

In TYPE 1, the catalyst degradation determination flag $F_{SCR\_AGED}$ is determined based on a difference between a time elapsed from initiating control to reduced the storage amount in accordance with the catalyst degradation determination mode flag $F_{OBD\_MODE}$ being set to "1" from "0", until the slip determination flag $F_{NH3\_SLIP}$ becomes "1" (hereinafter referred to as "slip occurrence timing") $PRD_{NH3\_SLIP}$ (refer to the following formula (20)) and a predetermined reference parameter $PRD_{NH3\_SLIP\_HAT}$ (refer to the following formula (22)).

The slip occurrence timing $PRD_{NH3\_SLIP}$ adopts a value of a degradation determination mode elapsed time $TM_{NH3\_SLIP}$ of when the slip determination flag $F_{NH3\_SLIP}$ became "1", while the catalyst degradation determination mode flag $F_{OBD\_NODE}$ is "1", as shown in the following formula (20).

$$PRD_{NH3\_SLIP}(k) = \begin{cases} 0 & \text{(OTHER CONDITIONS)} \\ TM_{NH3\_SLIP}(k) & (F_{NH3\_SLIP}(k) = 1 \text{ and } F_{OBD\_MODE}(k) = 1) \end{cases} \quad (20)$$

It should be noted that the degradation determination mode elapsed time $TM_{NH3\_SLIP}$ which indicates a time elapsed since setting the catalyst degradation determination mode flag $F_{OBD\_MODE}$ to "1", is calculated by adding a control period $DTM_{OBD}$ at every control time, as shown in the following formula (21).

$$TM_{NH3\_SLIP}(k) = \begin{cases} 0 & (F_{OBD\_MODE}(k) = 0) \\ TM_{NH3\_SLIP}(k-1) + DTM_{OBD} & (F_{OBD\_MODE_E}(k) = 1) \end{cases} \quad (21)$$

In addition, with TYPE 1, the slip occurrence timing for a case assuming the selective reduction catalyst to be in the aforementioned reference state, i.e. time elapsed since initiating control to reduce the storage amount until the slip estimation flag $F_{NH3\_SLIP\_HAT}$ becomes "1" (hereinafter referred to as "estimated slip occurrence timing") is used as the reference parameter $PRD_{NH3\_SLIP\_HAT}$. This estimated slip occurrence timing $PRD_{NH3\_SLIP\_HAT}$ adopts a value of the degradation determination mode elapsed time $TM_{NH3\_SLIP}$ of when the slip estimation flag $F_{NH3\_SLIP\_HAT}$ became "1", while the catalyst degradation determination mode flag $F_{OBD\_MODE}$ is "1", as shown in the following formula (22).

$$PRD_{NH3\_SLIP\_HAT}(k) = \begin{cases} 0 & \text{(OTHER CONDITIONS)} \\ TM_{NH3\_SLIP}(k) & (F_{NH3\_SLIP\_HAT}(k) = 1 \text{ and } F_{OBD\_MODE}(k) = 1) \end{cases} \quad (22)$$

A slip occurrence time difference $DPRD_{NH3\_SLIP}$ is calculated by subtracting the slip occurrence timing $PRD_{NH3\_SLIP}$ from the estimated slip occurrence timing $PRD_{NH3\_SLIP\_HAT}$, as shown in the following formula (23).

$$DPRD_{NH3\_SLIP}(k) = \begin{cases} PRD_{NH3\_SLIP\_HAT}(k) - PRD_{NH3\_SLIP}(k) & \begin{pmatrix} F_{OBD\_MODE}(k) = 1 \text{ and} \\ F_{NH3\_SLIP\_HAT}(k) = 1 \text{ and} \\ F_{NH3\_SLIP}(k) = 1 \end{pmatrix} \\ 0 & \text{(OTHER CONDITIONS)} \end{cases} \quad (23)$$

Figure 13:
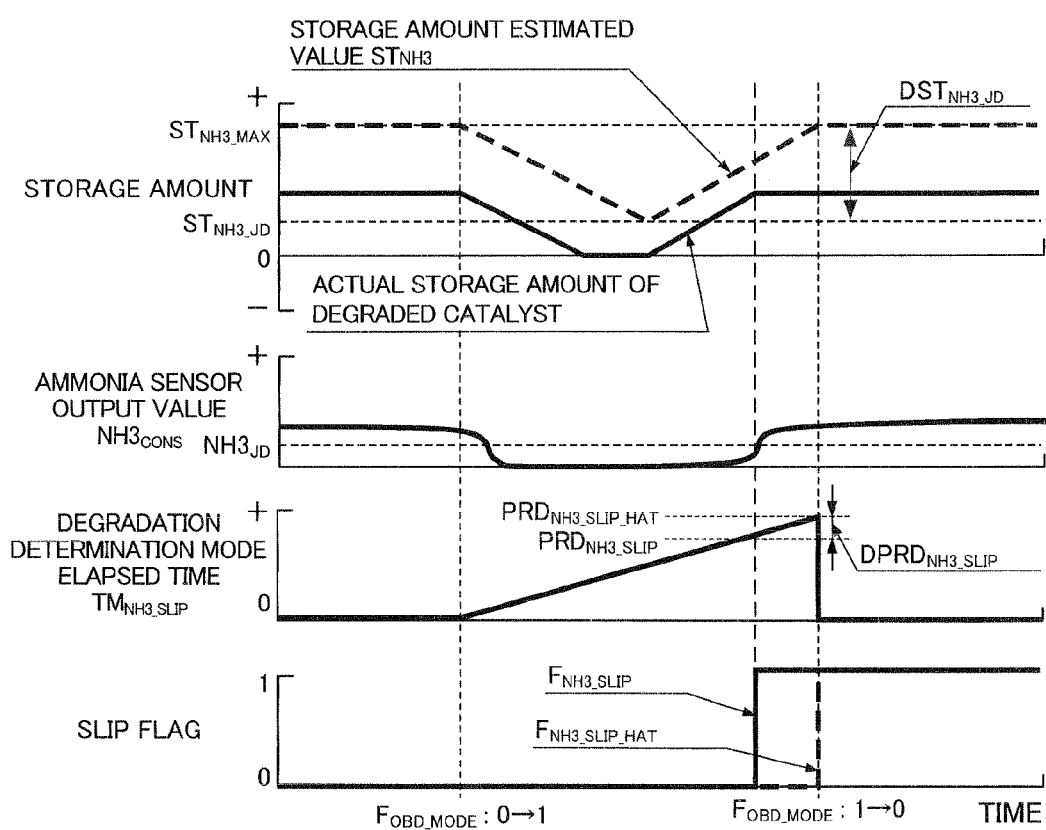
FIG. 13 presents graphs showing an example of changes in the storage amount, output value of the ammonia sensor, degradation determination mode elapsed time, slip determination flag, and slip estimation flag during degradation determination according to the embodiment.

FIG. 13 presents graphs showing an example of changes in the storage amount, output value of the ammonia sensor $NH3_{CONS}$, degradation determination mode elapsed time $TM_{NH3\_SLIP}$, slip determination flag $F_{NH3\_SLIP}$ and slip estimation flag $F_{NH3\_SLIP\_HAT}$ during degradation determination. In this example, a selective reduction catalyst in a degraded state having a storage capacity smaller than the detection reduced-amount portion $DST_{NH3\_JD}$ is used.

In response to the catalyst degradation determination mode flag $F_{OBD\_MODE}$ having been set to "1" from "0", control is performed to reduce the storage amount by the detection reduced-amount portion $DST_{NH3\_JD}$, and then to increase the storage amount until ammonia slip occurs. At this time, the behavior of the actual storage amount of a selective reduction catalyst in a degraded state (solid line) and the estimated value $ST_{NH3}$ of the storage amount of a selective reduction catalyst in a reference state (dotted line) are compared.

When performing control to reduce the storage amount by the detection reduced-amount portion $DST_{NH3\_JD}$, the actual storage amount of the selective reduction catalyst becomes zero during the time until the storage amount estimated value $ST_{NH3}$ reaches the storage amount target value $ST_{NH3\_JD}$ for degradation determination. Thereafter, when performing control to increase the storage amount, the actual storage amount in the selective reduction catalyst reaches the storage capacity thereof and the slip determination flag $F_{NH3\_SLIP}$ becomes "1", during the time until the storage amount estimated value $ST_{NH3}$ reaches the storage capacity estimated value $ST_{NH3\_MAX}$ and the slip estimation flag $F_{NH3\_SLIP\_HAT}$ becomes "1".

Such a difference between the time at which the slip determination flag $F_{NH3\_SLIP}$ became "1" and the time at which the slip estimation flag $F_{NH3\_SLIP\_HAT}$ became "1" can be detected as the slip occurrence time difference $DPRD_{NH3\_SLIP}$ of the above formula (23).

On the other hand, the difference between the times at which the two above-mentioned flags $F_{NH3\_SLIP}$ and $F_{NH3\_SLIP\_HAT}$ became "1" is considered to increase depending on the difference between the actual storage capacity of the selective reduction catalyst and the detection reduced-amount portion $DST_{NH3\_JD}$ i.e. the progression level of the degradation of the selective reduction catalyst. Therefore, the degradation can be determined by setting a predetermined threshold value $DPRD_{NH3\_SLIP\_JD}$ for the slip occurrence time difference $DPRD_{NH3\_SLIP}$.

More specifically, in a case of the slip occurrence time difference $DPRD_{NH3\_SLIP}$ being smaller than the threshold value $DPRD_{NH3\_SLIP\_JD}$, the catalyst is determined to be in a normal state, and the catalyst degradation determination flag $F_{SCR\_AGED}$ is set to "0", as shown in the following formula (24). On the other hand, in a case of the slip occurrence time difference $DPRD_{NH3\_SLIP}$ being at least the threshold value $DPRD_{NH3\_SLIP\_JD}$, the catalyst is determined to be in a degraded state, and the catalyst degradation determination flag $F_{SCR\_AGED}$ is set to "1".

$$F_{SCR\_AGED}(k) = \begin{cases} 0: \text{NORMAL} & DPRD_{NH3\_SLIP}(k) < DPRD_{NH3\_SLIP\_JD} \\ & \begin{pmatrix} F_{OBD\_MODE}(k) = 1 \text{ and} \\ F_{NH3\_SLIP\_HAT}(k) = 1 \text{ and } F_{NH3\_SLIP}(k) = 1 \end{pmatrix} \\ 1: \text{DEGRADED} & DPRD_{NH3\_SLIP}(k) \geq DPRD_{NH3\_SLIP\_JD} \\ & \begin{pmatrix} F_{OBD\_MODE}(k) = 1 \text{ and} \\ F_{NH3\_SLIP\_HAT}(k) = 1 \text{ and } F_{NH3\_SLIP}(k) = 1 \end{pmatrix} \\ F_{SCR\_AGED}(k-1) & \begin{pmatrix} \text{OTHER CONDITIONS,} \\ \text{INITIAL VALUE} = 0 \end{pmatrix} \end{cases} \quad (24)$$

Type 2

In TYPE 2, the catalyst degradation determination flag $F_{SCR\_AGED}$ is determined while the catalyst degradation determination mode flag $F_{OBD\_MODE}$ is set to "1", based on a difference between a time elapsed since initiating control to increase the storage amount until the slip determination flag $F_{NH3\_SLIP}$ becomes "1" (hereinafter referred to as "slip occurrence timing" $PRD_{NH3\_SLIP}'$ (refer to the following formula (25)) and a predetermined reference parameter $PRD_{NH3\_SLIP\_HAT}$ (refer to the following formula (27)).

The slip occurrence timing $PRD_{NH3\_SLIP}'$ adopts the value of a degradation determination mode elapsed time $TM_{NH3\_SLIP}'$ of when the slip determination flag $F_{NH3\_SLIP}$ became "1", while the catalyst degradation determination mode flag $F_{OBD\_MODE}$ is "1", as shown in the following formula (25)

$$PRD'_{NH3\_SLIP}(k) = \begin{cases} 0 & \text{(OTHER CONDITIONS)} \\ TM'_{NH3\_SLIP}(k) & (F_{NH3\_SLIP}(k) = 1 \text{ and } F_{OBD\_MODE}(k) = 1) \end{cases} \quad (25)$$

It should be noted that the degradation determination mode elapsed time $TM_{NH3\_SLIP}'$, which indicates the time elapsed since controlling to increase the storage amount, i.e. setting the injection amount switching flag $F_{UREA\_SW}$ to "0", is calculated by adding the control period $DTM_{OBD}$ at every control time, as shown in the following formula (26)

$$TM'_{NH3\_SLIP}(k) = \begin{cases} 0 & \text{(OTHER CONDITIONS)} \\ TM'_{NH3\_SLIP}(k-1) + DTM_{OBD} & \begin{pmatrix} F_{OBD\_MODE}(k) = 1 \text{ and} \\ F_{UREA\_SW}(k) = 0 \end{pmatrix} \end{cases} \quad (26)$$

In addition, with TYPE 2, the slip occurrence timing for a case assuming the selective reduction catalyst to be in the aforementioned reference state, i.e. time elapsed since initiating control to increase the storage amount until the slip estimation flag $F_{NH3\_SLIP\_HAT}$ becomes "1" (hereinafter referred to as "estimated slip occurrence timing"), is used as the reference parameter $PRD_{NH3\_SLIP\_HAT}'$. This estimated slip occurrence timing $PRD_{NH3\_SLIP\_HAT}'$ adopts the value of the degradation determination mode elapsed time $TM_{NH3\_SLIP}'$ of when the slip estimation flag $F_{NH3\_SLIP\_HAT}$ became "1", while the catalyst degradation determination mode flag $F_{OBD\_MODE}$ is "1", as shown in the following formula (27).

$$PRD'_{NH3\_SLIP\_HAT}(k) = \begin{cases} 0 & \text{(OTHER CONDITIONS)} \\ TM'_{NH3\_SLIP}(k) & (F_{NH3\_SLIP\_HAT}(k) = 1 \text{ and } F_{OBD\_MODE}(k) = 1) \end{cases} \quad (27)$$

A slip occurrence time difference $DPRD_{NH3\_SLIP}'$ is calculated by subtracting the slip occurrence timing $PRD_{NH3\_SLIP}'$ from the estimated slip occurrence timing $PRD_{NH3\_SLIP\_HAT}'$, as shown in the following formula (28).

$$DPRD'_{NH3\_SLIP}(k) = \begin{cases} PRD'_{NH3\_SLIP\_HAT}(k) - & \begin{pmatrix} F_{OBD\_MODE}(k) = 1 \text{ and} \\ F_{NH3\_SLIP\_HAT}(k) = 1 \text{ and} \\ F_{NH3\_SLIP}(k) = 1 \end{pmatrix} \\ 0 & \text{(OTHER CONDITIONS)} \end{cases} \quad (28)$$

Figure 14:
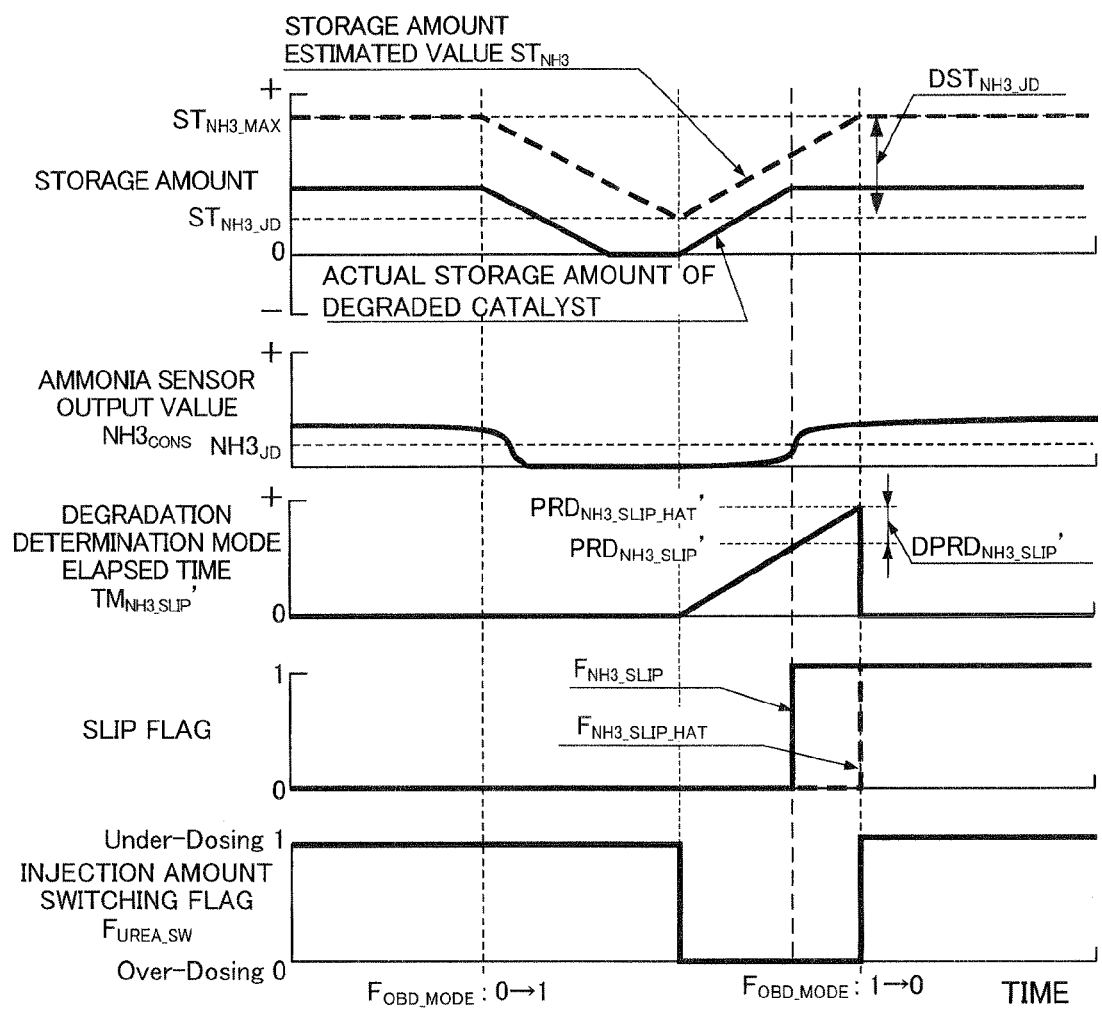
FIG. 14 presents graphs showing an example of changes in the storage amount, output value of the ammonia sensor, degradation determination mode elapsed time, slip determination flag, slip estimation flag, and injection amount switching flag during degradation determination according to the embodiment.

FIG. 14 presents graphs showing an example of changes in the storage amount, output value of the ammonia sensor $NH3_{CONS}$, degradation determination mode elapsed time $TM_{NH3\_SLIP}'$, slip determination flag $F_{NH3\_SLIP}$, slip estimation flag $F_{NH3\_SLIP\_HAT}$, and injection amount switching flag $F_{UREA\_SW}$ during degradation determination. In this example, a selective reduction catalyst in a degraded state having a storage capacity smaller than the detection reduced-amount portion $DST_{NH3\_JD}$ is used.

An explanation of the aspect of a difference arising between the time at which the slip determination flag $F_{NH3\_SLIP}$ becomes "1" and the time at which the slip estimation flag $F_{NH3\_SLIP\_HAT}$ becomes "1" when fluctuating the storage amount will be omitted due to being the same as the aforementioned TYPE 1. In TYPE 2, such a difference between the time at which the slip determination flag $F_{NH3\_SLIP}$ becomes "1" and the time at which the slip estimation flag $F_{NH3\_SLIP\_HAT}$ becomes "1" is detected as the slip occurrence time difference $DPRD_{NH3\_SLIP}'$ of the above formula (28).

On the other hand, the difference between times at which the two above-mentioned flags $F_{NH3\_SLIP}$ and $F_{NH3\_SLIP\_HAT}$ became "1" is considered to increase according to the progression level of degradation of the selective reduction catalyst, as described above in TYPE 1. Therefore, degradation can be determined by way of setting a predetermined threshold value $DPRD_{NH3\_SLIP\_JD}'$ for the slip occurrence time difference $DPRD_{NH3\_SLIP}'$.

More specifically, in a case of the slip occurrence time difference $DPRD_{NH3\_SLIP}'$ being less than the threshold value $DPRD_{NH3\_SLIP\_JD}'$, the catalyst is determined to be in a normal state, and the catalyst degradation determination flag $F_{SCR\_AGED}$ is set to "0", as shown in the following formula (29). On the other hand, in a case of the slip occurrence time difference $DPRD_{NH3\_SLIP}'$ being at least the threshold value $DPRD_{NH3\_SLIP\_JD}'$, the catalyst is determined to be in a degraded state, and the catalyst degradation determination flag $F_{SCR\_AGED}$ is set to "1".

$$F_{SCR\_AGEDP}(k) = \begin{cases} 0: \text{NORMAL} & DPRD'_{NH3}(k) < DPRD'_{NH3\_SLIP\_JD} \\ & \begin{pmatrix} F_{OBD\_MODE}(k) = 1 \text{ and} \\ F_{NH3\_SLIP\_HAT}(k) = 1 \text{ and } F_{NH3\_SLIP}(k) = 1 \end{pmatrix} \\ 1: \text{DEGRADED} & DPRD'_{NH3\_SLIP}(k) \geq DPRD'_{NH3\_SLIP\_JD} \\ & \begin{pmatrix} F_{OBD\_MODE}(k) = 1 \text{ and} \\ F_{NH3\_SLIP\_HAT}(k) = 1 \text{ and } F_{NH3\_SLIP}(k) = 1 \end{pmatrix} \\ F_{SCR\_AGED}(k-1) & \begin{pmatrix} \text{OTHER CONDITIONS,} \\ \text{INITIAL VALUE} = 0 \end{pmatrix} \end{cases} \quad (29)$$

Type 3

In TYPE 3, the catalyst degradation determination flag $F_{SCR\_AGED}$ is determined based on a difference between a variation amount of the storage amount during the time from initiating control to reduce the storage amount in accordance with the catalyst degradation determination mode flag $F_{OBD\_MODE}$ being set to "1" from "0", until the slip determination flag $F_{NH3\_SLIP}$ becomes "1" (hereinafter referred to as "slip occurrence time variation amount" $SUM_{UREA\_SLIP}$ (refer to the following formula (30)) and a predetermined reference parameter $SUM_{UREA\_SLIP\_HAT}$ (refer to the following formula (32)).

The slip occurrence time variation amount $SUM_{UREA\_SLIP}$ adopts the value of a degradation determination mode variation amount $SUM_{UREA}$ of when the slip determination flag $F_{NH3\_SLIP}$ became "1", while the catalyst degradation determination flag $F_{OBD\_NODE}$ is "1", as shown in the following formula (30).

$$SUM_{UREA\_SLIP}(k) = \quad (30)$$
$$\begin{cases} 0 & (\text{OTHER CONDITIONS}) \\ SUM_{UREA}(k) & (F_{NH3\_SLIP}(k) = 1 \text{ and } F_{OBD\_MODE}(k) = 1) \end{cases}$$

It should be noted that the degradation determination mode variation amount $SUM_{UREA}$, which indicates the variation amount of the storage amount since setting the catalyst degradation determination mode flag $F_{OBD\_MODE}$ to "1", is calculated by adding the switching injection amount $G_{UREA\_SW}$ at every control time, as shown in the following formula (31).

$$SUM_{UREA}(k) = \quad (31)$$
$$\begin{cases} 0 & (F_{OBD\_MODE}(k) = 0) \\ SUM_{UREA}(k-1) + G_{UREA\_SW}(k) & (F_{OBD\_MODE}(k) = 1) \end{cases}$$

In addition, with TYPE 3, a slip occurrence time variation amount in a case of assuming the selective reduction catalyst to be in the aforementioned reference state, i.e. a variation amount of the storage amount during the time from initiating control to reduce the storage capacity until the slip estimation flag $F_{NH3\_SLIP\_HAT}$ becomes "1" (hereinafter referred to as "estimated slip occurrence time variation amount") is used as the reference parameter $SUM_{UREA\_SLIP\_HAT}$. This estimated slip occurrence time variation amount $SUM_{UREA\_SLIP\_HAT}$ adopts the value of the degradation determination mode variation amount $SUM_{UREA}$ of when the slip estimation flag $F_{NH3\_SLIP\_HAT}$ became "1", while the catalyst degradation determination mode flag $F_{OBD\_MODE}$ is "1", as shown in the following formula (32).

$$SUM_{UREA\_SLIP\_HAT}(k) = \quad (32)$$
$$\begin{cases} 0 & (\text{OTHER CONDITIONS}) \\ SUM_{UREA}(k) & (F_{NH3\_SLIP\_HAT}(k) = 1 \text{ and } F_{OBD\_MODE}(k) = 1) \end{cases}$$

A slip occurrence time storage amount difference $DSUM_{UREA\_SLIP}$ is calculated by subtracting the slip occurrence time variation amount $SUM_{UREA\_SLIP}$ from the estimated slip occurrence time variation amount $SUM_{UREA\_SLIP\_HAT}$, as shown in the following formula (33).

$$DSUM_{UREA\_SLIP}(k) = \quad (33)$$
$$\begin{cases} SUM_{UREA\_SLIP\_HAT}(k) - SUM_{UREA\_SLIP}(k) & \begin{pmatrix} F_{OBD\_MODE}(k) = 1 \text{ and} \\ F_{NH3\_SLIP\_HAT}(k) = 1 \text{ and} \\ F_{NH3\_SLIP}(k) = 1 \end{pmatrix} \\ 0 & (\text{OTHER CONDITIONS}) \end{cases}$$

Figure 15:
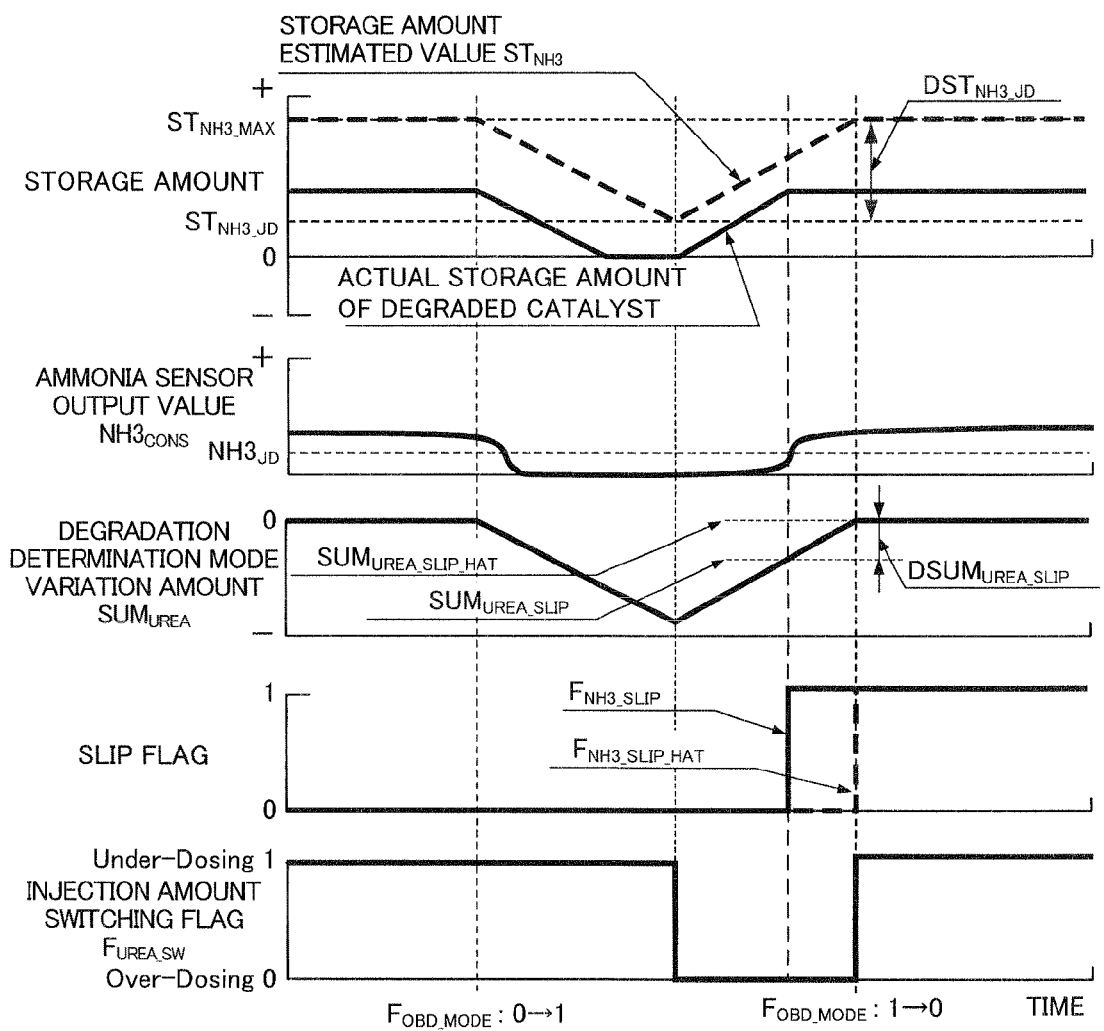
FIG. 15 presents graphs showing an example of changes in the storage amount, output value of the ammonia sensor, degradation determination mode variation amount, slip determination flag, slip estimation flag, and injection amount switching flag during degradation determination according to the embodiment.

FIG. 15 presents graphs showing an example of changes in the storage amount, output value of the ammonia sensor $NH3_{CONS}$, degradation determination mode variation amount $SUM_{UREA}$, slip determination flag $F_{NH3\_SLIP}$, slip estimation flag $F_{NH3\_SLIP\_HAT}$, and injection amount switching flag $F_{UREA\_SW}$ during degradation determination. In this example, a selective reduction catalyst in a degraded state having a storage capacity smaller than the detection reduced-amount portion $DST_{NH3\_JD}$ is used.

An explanation of the aspect of a difference arising between the time at which the slip determination flag $F_{NH3\_SLIP}$ becomes "1" and the time at which the slip estimation flag $F_{NH3\_SLIP\_HAT}$ becomes "1" when fluctuating the storage amount will be omitted due to being the same as the aforementioned TYPE 1. In TYPE 3, such a difference between the time at which the slip determination flag $F_{NH3\_SLIP}$ becomes "1" and the time at which the slip estimation flag $F_{NH3\_SLIP}$ becomes "1" is detected as the slip occurrence time storage amount difference $DSUM_{UREA\_SLIP}$ of the above formula (33).

On the other hand, the difference between times at which the two above-mentioned flags $F_{NH3\_SLIP}$ and $F_{NH3\_SLIP\_HAT}$ become "1" is considered to increase according to the progression level of degradation of the selective reduction catalyst, as described above in TYPE 1. Therefore, degradation can be determined by way of setting a predetermined threshold value $DSUM_{UREA\_SLIP\_JD}$ for the slip occurrence time storage amount difference $DSUM_{UREA\_SLIP}$.

More specifically, in a case of the slip occurrence time storage amount difference $DSUM_{UREA\_SLIP}$ being less than the threshold value $DSUM_{UREA\_SLIP\_JD}$, the catalyst is determined to be in a normal state, and the catalyst degradation determination flag $F_{SCR\_AGED}$ is set to "0", as shown in the following formula (34). On the other hand, in a case of the slip occurrence time storage amount difference $DSUM_{UREA\_SLIP}$ being at least the threshold value $DSUM_{UREA\_SLIP\_JD}$, the catalyst is determined to be in a degraded state, and the catalyst degradation determination flag $F_{SCR\_AGED}$ is set to "1".

$$F_{SCR\_AGEDP}(k) = \begin{cases} 0: \text{NORMAL} & DSUM_{UREA\_SLIP}(k) < DSUM_{UREA\_SLIP\_JD} \\ & \begin{pmatrix} F_{OBD\_MODE}(k) = 1 \text{ and} \\ F_{NH3\_SLIP\_HAT}(k) = 1 \text{ and } F_{NH3\_SLIP}(k) = 1 \end{pmatrix} \\ 1: \text{DEGRADED} & DSUM_{UREA\_SLIP}(k) \geq DSUM_{UREA\_SLIP\_JD} \\ & \begin{pmatrix} F_{OBD\_MODE}(k) = 1 \text{ and} \\ F_{NH3\_SLIP\_HAT}(k) = 1 \text{ and } F_{NH3\_SLIP}(k) = 1 \end{pmatrix} \\ F_{SCR\_AGED}(k-1) & \begin{pmatrix} \text{OTHER CONDITIONS,} \\ \text{INITIAL VALUE} = 0 \end{pmatrix} \end{cases} \quad (29)$$

Type 4

In TYPE 4, the catalyst degradation determination flag $F_{SCR\_AGED}$ is determined while the catalyst degradation determination mode flag $F_{OBD\_MODE}$ is set to "1", based on a difference between a variation amount of the storage amount during the time from initiating control to increase the storage amount until the slip determination flag $F_{NH3\_SLIP}$ becomes "1" (hereinafter referred to as "slip occurrence time variation amount" $SUM_{UREA\_SLIP}'$ (refer to the following formula (35)) and a predetermined reference parameter $SUM_{UREA\_SLIP\_HAT}'$ (refer to the following formula (37)).

The slip occurrence time variation amount $SUM_{UREA\_SLIP}'$ adopts the value of a degradation determination mode variation amount $SUM_{UREA}'$ of when the slip determination flag $F_{NH3\_SLIP}$ became "1", while the catalyst degradation determination flag $F_{OBD\_MODE}$ is "1", as shown in the following formula (35).

$$SUM'_{UREA\_SLIP}(k) = \begin{cases} 0 & \text{(OTHER CONDITIONS)} \\ SUM'_{UREA}(k) & (F_{NH3\_SLIP}(k) = 1 \text{ and } F_{OBD\_MODE}(k) = 1) \end{cases} \quad (35)$$

It should be noted that the degradation determination mode variation amount $SUM_{UREA}'$, which indicates the variation amount of the storage amount since controlling to increase the storage amount, i.e. since setting the injection amount switching flag $F_{UREA\_SW}$ to "0", is calculated by adding the switching injection amount $G_{UREA\_SW}$ at every control time, as shown in the following formula (36).

$$SUM'_{UREA}(k) = \begin{cases} 0 & \text{(OTHER CONDITIONS)} \\ SUM'_{UREA}(k-1) + G_{UREA\_SW}(k) & \begin{pmatrix} F_{OBD\_MODE}(k) = 1 \text{ and} \\ F_{UREA\_SW}(k) = 0 \end{pmatrix} \end{cases} \quad (36)$$

In addition, with TYPE 4, a slip occurrence time variation amount in a case of assuming the selective reduction catalyst to be in the aforementioned reference state, i.e. a variation amount of the storage amount during the time from initiating control to increase the storage capacity until the slip estimation flag $F_{NH3\_SLIP\_HAT}$ becomes "1" (hereinafter referred to as "estimated slip occurrence time variation amount") is used as the reference parameter $SUM_{UREA\_SLIP\_HAT}'$. This estimated slip occurrence time variation amount $SUM_{UREA\_SLIP\_HAT}'$ adopts the value of the degradation determination mode variation amount $SUM_{UREA}'$ of when the slip estimation flag $F_{NH3\_SLIP\_HAT}$ became "1", while the catalyst degradation determination mode flag $F_{OBD\_MODE}$ is "1", as shown in the following formula (37).

$$SUM'_{UREA\_SLIP\_HAT}(k) = \begin{cases} 0 & \text{(OTHER CONDITIONS)} \\ SUM'_{UREA}(k) & (F_{NH3\_SLIP\_HAT}(k) = 1 \text{ and } F_{OBD\_MODE}(k) = 1) \end{cases} \quad (37)$$

A slip occurrence time storage amount difference $DSUM_{UREA\_SLIP}'$ is calculated by subtracting the slip occurrence time variation amount $SUM_{UREA\_SLIP}'$ from the estimated slip occurrence time variation amount $SUM_{UREA\_SLIP\_HAT}'$, as shown in the following formula (38).

$$DSUM'_{UREA\_SLIP}(k) = \begin{cases} SUM'_{UREA\_SLIP\_HAT}(k) - \\ SUM'_{UREA\_SLIP}(k) & \begin{pmatrix} F_{OBD\_MODE}(k) = 1 \text{ and} \\ F_{NH3\_SLIP\_HAT}(k) = 1 \text{ and} \\ F_{NH3\_SLIP}(k) = 1 \end{pmatrix} \\ 0 & \text{(OTHER CONDITIONS)} \end{cases} \quad (38)$$

Figure 16:
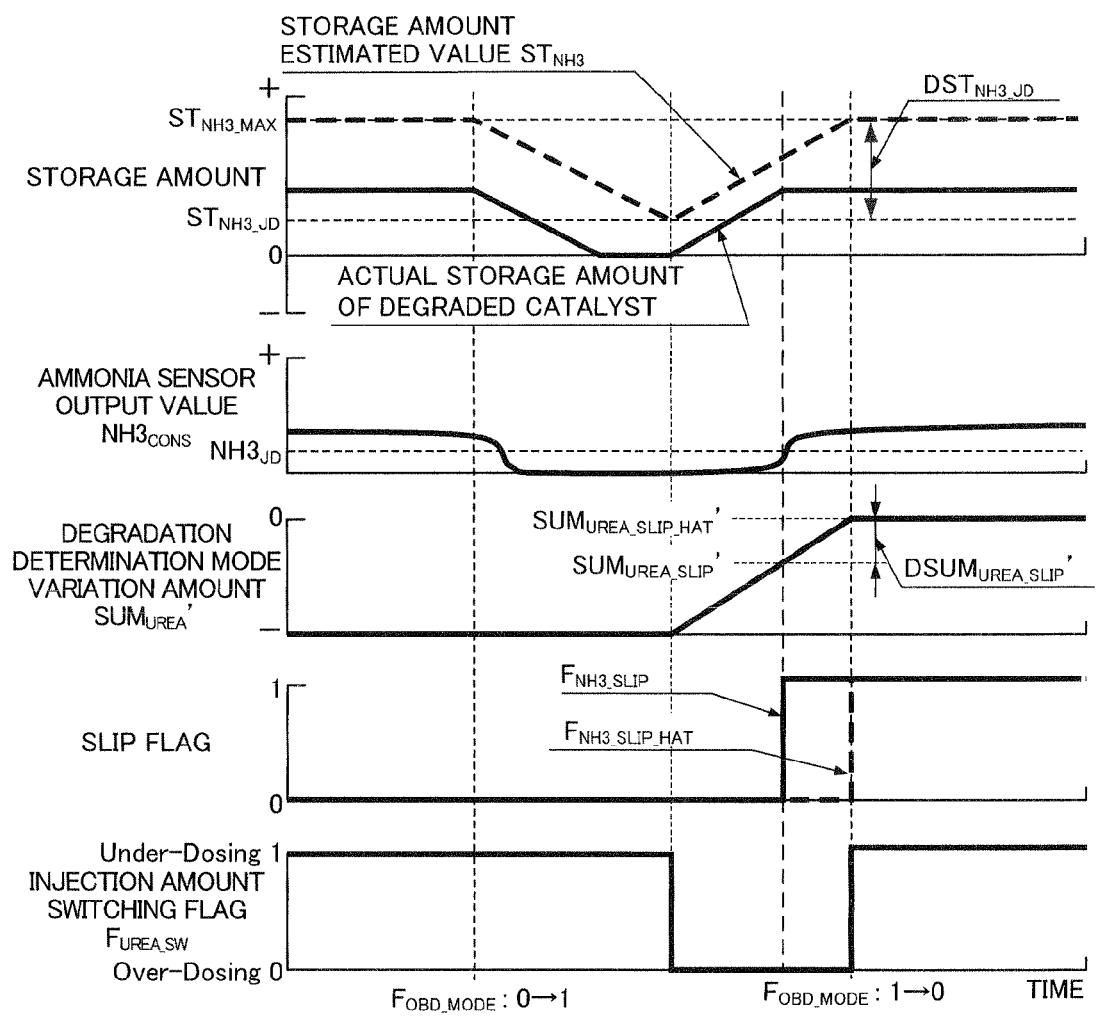
FIG. 16 present graphs showing an example of changes in the storage amount, output value of the ammonia sensor, degradation determination mode variation amount, slip determination flag, slip estimation flag, and injection amount switching flag during degradation determination according to the embodiment.

FIG. 16 presents graphs showing an example of changes in the storage amount, output value of the ammonia sensor $NH3_{CONS}$, degradation determination mode variation amount $SUM_{UREA}'$, slip determination flag $F_{NH3\_SLIP}$ slip estimation flag $F_{NH3\_SLIP\_HAT}$, and injection amount switching flag $F_{UREA\_SW}$ during degradation determination. In this example, a selective reduction catalyst in a degraded state having a storage capacity smaller than the detection reduced-amount portion $DST_{NH3\_JD}$ is used.

An explanation of the aspect of a difference arising between the time at which the slip determination flag $F_{NH3\_SLIP}$ becomes "1" and the time at which the slip estimation flag $F_{NH3\_SLIP\_HAT}$ becomes "1" when fluctuating the storage amount will be omitted due to being the same as the aforementioned TYPE 1. In TYPE 4, such a difference between the time at which the slip determination flag $F_{NH3\_SLIP}$ becomes "1" and the time at which the slip estimation flag $F_{NH3\_SLIP\_HAT}$ becomes "1" is detected as the slip occurrence time storage amount difference $DSUM_{UREA\_SLIP}'$ of the above formula (38).

On the other hand, the difference between times at which the two above-mentioned flags $F_{NH3\_SLIP}$ and $F_{NH3\_SLIP\_HAT}$ become "1" is considered to increase according to the progression level of degradation of the selective reduction catalyst, as described above in TYPE 1. Therefore, degradation can be determined by way of setting a predetermined threshold value $DSUM_{UREA\_SLIP\_JD}'$ for the slip occurrence time storage amount difference $DSUM_{UREA\_SLIP}'$.

More specifically, in a case of the slip occurrence time storage amount difference $DSUM_{UREA\_SLIP}'$ being less than the threshold value $DSUM_{UREA\_SLIP\_JD}'$, the catalyst is determined to be in a normal state, and the catalyst degradation determination flag $F_{SCR\_AGED}$ is set to "0", as shown in the following formula (39). On the other hand, in a case of the slip occurrence time storage amount difference $DSUM_{UREA\_SLIP}'$ being at least the threshold value $DSUM_{UREA\_SLIP\_JD}'$, the catalyst is determined to be in a degraded state, and the catalyst degradation determination flag $F_{SCR\_AGED}$ is set to "1".

$$F_{SCR\_AGED}(k) = \begin{cases} 0: \text{NORMAL} & DSUM'_{UREA\_SLIP}(k) < DSUM'_{UREA\_SLIP\_JD} \\ & \begin{pmatrix} F_{OBD\_MODE}(k) = 1 \text{ and} \\ F_{NH3\_SLIP\_HAT}(k) = 1 \text{ and } F_{NH3\_SLIP}(k) = 1 \end{pmatrix} \\ 1: \text{DEGRADED} & DSUM'_{UREA\_SLIP}(k) \geq DSUM'_{UREA\_SLIP\_JD} \\ & \begin{pmatrix} F_{OBD\_MODE}(k) = 1 \text{ and} \\ F_{NH3\_SLIP\_HAT}(k) = 1 \text{ and } F_{NH3\_SLIP}(k) = 1 \end{pmatrix} \\ F_{SCR\_AGED}(k-1) & \begin{pmatrix} \text{OTHER CONDITIONS,} \\ \text{INITIAL VALUE} = 0 \end{pmatrix} \end{cases} \quad (39)$$

A case of determining degradation based on the algorithm of TYPE 1 will be explained as an example for the operation of the catalyst degradation determination unit configured in the above way.

Figure 17:
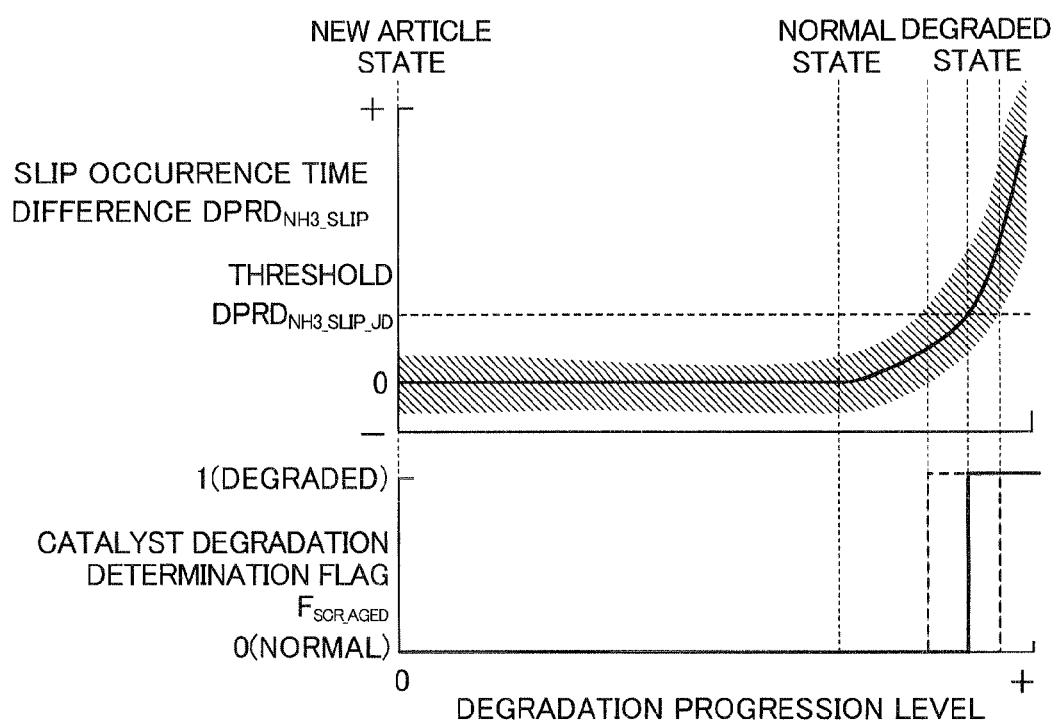
FIG. 17 is a graph showing a relationship between the actual degradation progression level of the selective reduction catalyst and the catalyst degradation determination flag and slip occurrence time difference according to the embodiment.

FIG. 17 is a graph showing a relationship between the actual degradation progression level of a selective reduction catalyst and the catalyst degradation determination flag SCR AGED and slip occurrence time difference $DPRD_{NH3\_SLIP}$. It should be noted that, due to being calculated based on the estimated value $ST_{NH3}$ of the storage amount, the slip occurrence time difference $DPRD_{NH3\_SLIP}$ becomes a distribution of values within a range such as that shown by the hatching in FIG. 17. In addition, error such as that shown by the dotted lines in FIG. 17 occurs in the behavior of the catalyst degradation determination flag $F_{SCR\_AGED}$ which causes error to occur in such a slip occurrence time difference $DPRD_{NH3\_SLIP}$.

Since ammonia is not depleted in the case of the actual storage capacity of the selective reduction catalyst being at least the detection reduced-amount portion $DST_{NH3\_JD}$, even if fluctuating the storage amount by the detection reduced-amount portion $DST_{NH3\_JD}$ in the above described way, the slip occurrence time difference $DPRD_{NH3\_SLIP}$ will be substantially zero irrespective of the degradation progression level of the catalyst.

In addition, if degradation progresses until the actual storage capacity of the selective reduction catalyst falls below the detection reduced-amount portion $DST_{NH3\_JD}$, the slip occurrence time difference $DPRD_{NH3\_SLIP}$ will increase according to the degradation progression level. Then, the catalyst degradation determination flag $F_{SCR\_AGED}$ will be set to "1" from "0" when the slip occurrence time difference $DPRD_{NH3\_SLIP}$ exceeds the threshold value $DPRD_{NH3\_SLIP\_JD}$.

In this way, the slip occurrence time difference $DPRD_{NH3\_SLIP}$ is not in a simple proportional relationship with the degradation progression level, and has a characteristic of possessing a value that becomes significant when degradation has progressed to some extent. The percentage of false determination compared to a case of determining the degradation of a catalyst based on an index that increases proportionally to the degradation progression level can be reduced by determining the degradation based on the slip occurrence time difference $DPRD_{NH3\_SLIP}$, which has such a characteristic, for example.

Sequence of Urea Injection Control

Next, a specific sequence of urea injection control will be explained while referring to FIG. 18.

Figure 18:
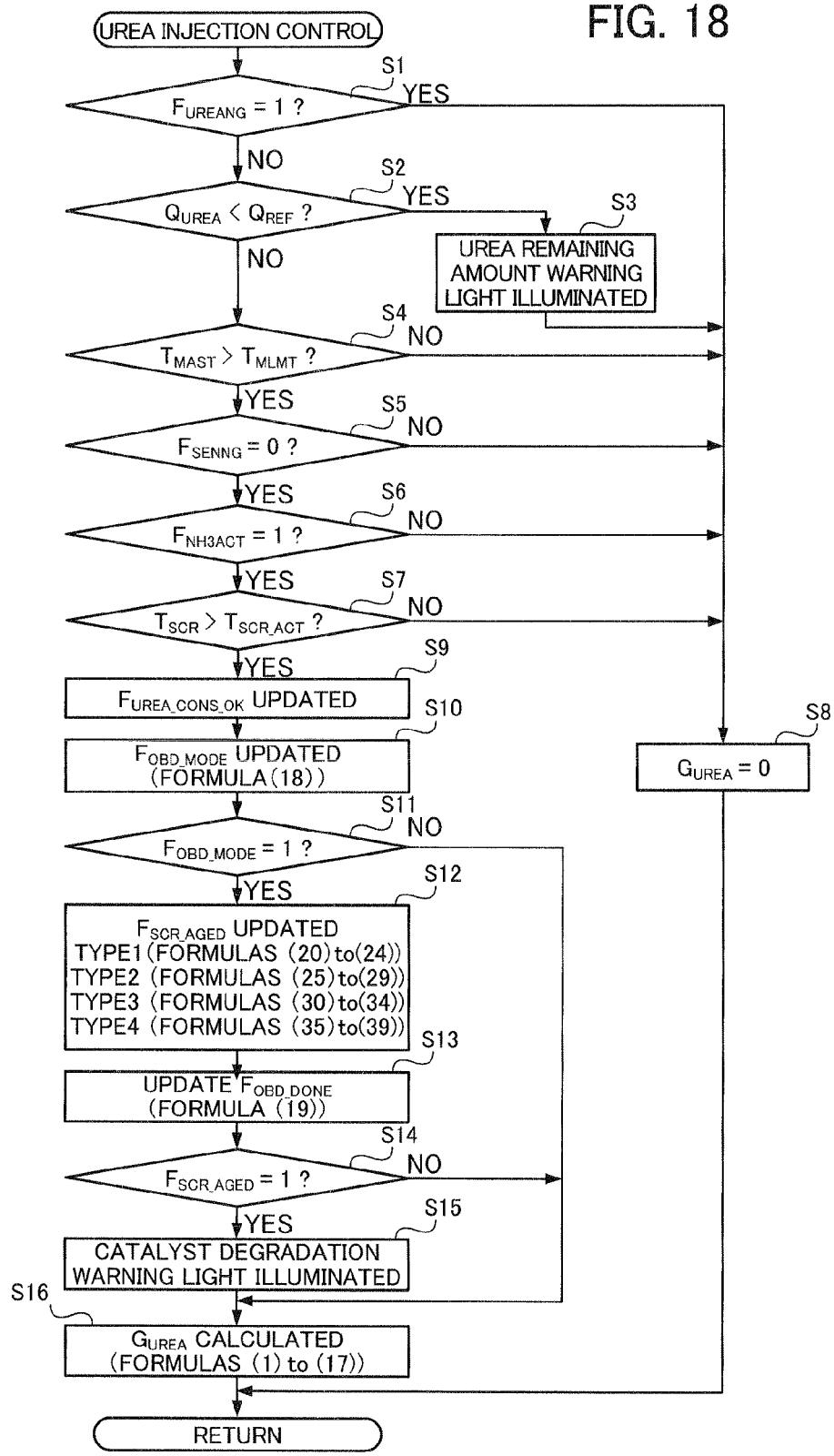
FIG. 18 is a flowchart showing a sequence of urea injection control according to the embodiment.

FIG. 18 is a flowchart showing a sequence of urea injection control executed by the ECU.

In Step S1, it is distinguished whether a urea fault flag $F_{UREANG}$ is "1". This urea fault flag $F_{UREANG}$ is set to "1" when it is determined that the urea injection device has failed in determination processing, which is not illustrated, and is set to "0" at times except for this. In a case of this determination being YES, Step S8 is advanced to, and after the urea injection amount $G_{UREA}$ has been set to "0", this processing ends. In a case of this determination being NO, Step S2 is advanced to.

In Step S2, it is distinguished whether the urea remaining amount $Q_{UREA}$ is less than a predetermined value $Q_{REF}$. This urea remaining amount $Q_{UREA}$ indicates a remaining amount of urea water in the urea tank, and is calculated based on an output of the urea level sensor. In a case of this determination being YES, Step S3 is advanced to, and in a case of being NO, Step S4 is advanced to.

In Step S3, the urea remaining amount warning light is illuminated, and Step S8 is advanced to, and after the urea injection amount $G_{UREA}$ has been set to "0", this processing ends.

In Step S4, it is distinguished whether a catalyst warm-up timer value $T_{MAST}$ is larger than a predetermined value $T_{MLMT}$. This catalyst warm-up timer value $T_{MAST}$ is a value keeping the warm-up time of the oxidation catalyst after engine startup. In a case of this determination being YES, Step S5 is advanced to. In a case of this determination being NO, Step S8 is advanced to, and after the urea injection amount $G_{UREA}$ has been set to "0", this processing ends.

In Step S5, it is distinguished whether a sensor fault flag $F_{SENNG}$ is "0". This sensor fault flag $F_{SENNG}$ is set to "1" when it is determined that the ammonia sensor or the catalyst temperature sensor has failed in the determination processing, which is not illustrated, and is set to "0" at times except for this. In a case of this determination being YES, Step S6 is advanced to. In a case of this determination being NO, Step S8 is advanced to, and after the urea injection amount $G_{UREA}$ has been set to "0", this processing ends.

In Step S6, it is distinguished whether an ammonia sensor activity flag $F_{NH3ACT}$ is 1. This ammonia sensor activity flag $F_{NH3ACT}$ is set to "1" when it is determined that the ammonia sensor has reached an active state in determination processing, which is not illustrated, and is set to "0" at times except for this. In a case of this determination being YES, Step S7 is advanced to. In a case of this determination being NO, Step S8 is advanced to, and after the urea injection amount $G_{UREA}$ has been set to "0", this processing ends.

In Step S7, it is distinguished whether the catalyst temperature sensor output value $T_{SCR}$ is larger than a predetermined value $T_{SCR\_ACT}$. In a case of this determination being YES, it is determined that the selective reduction catalyst has been activated, and Step S9 is advanced to. In a case of this determination being NO, it is determined that the selective reduction catalyst has not been activated yet and that urea injection should be stopped, Step S8 is advanced to, and after the urea injection amount $G_{UREA}$ has been set to "0", this processing ends.

In Step S9, the concentration determination flag $F_{UREACONS\_OK}$, which indicates that the concentration of the urea water is in a normal state, is updated based on the output value of the urea concentration sensor, and Step S10 is advanced to.

In Step S10, the catalyst degradation determination mode flag $F_{OBD\_MODE}$ is updated based on formula (18), and Step S11 is advance to. In Step S11, it is distinguished whether the catalyst degradation determination mode flag $F_{OBD\_MODE}$ is "1". In a case of this determination being NO, Step S16 is advanced to, and in a case of this determination being YES, Step S12 is advanced to.

In Step S12, the catalyst degradation determination flag $F_{SCR\_AGED}$ is updated based on any of the algorithm of TYPE 1 (formulas (20) to (24)), the algorithm of TYPE 2 (formulas (25) to (29)), the algorithm of TYPE 3 (formulas (30) to (34)), and the algorithm of TYPE 4 (formulas (35) to (39)), and Step S13 is advanced to.

In Step S13, the determination completion flag $F_{OBD\_DONE}$ is updated based on formula (19), and Step S14 is advanced to.

In Step S14, it is distinguished whether the catalyst degradation determination flag $F_{SCR\_AGED}$ is "1". In a case of this determination being YES, Step S15 is advanced to, and after a catalyst degradation warning light is illuminated, Step S16 is advanced to. In Step S16, the urea injection amount $G_{UREA}$ is calculated based on formulas (1) to (17), and this processing ends.

Simulation Results

Next, simulation results of urea injection control of the present embodiment will be described in detail while referring to FIGS. 19 to 21.

Herein, simulations were performed using selective reduction catalysts in three different types of states. More specifically, CASE 1 is a case using a selective reduction catalyst in a new-article state, CASE 2 is a case using a selective reduction catalyst in a normal state, and CASE 3 is a case using a selective reduction catalyst in a degraded state. It should be noted that the algorithm of the above-mentioned TYPE 1 was used in the determination of degradation.

Figure 19:
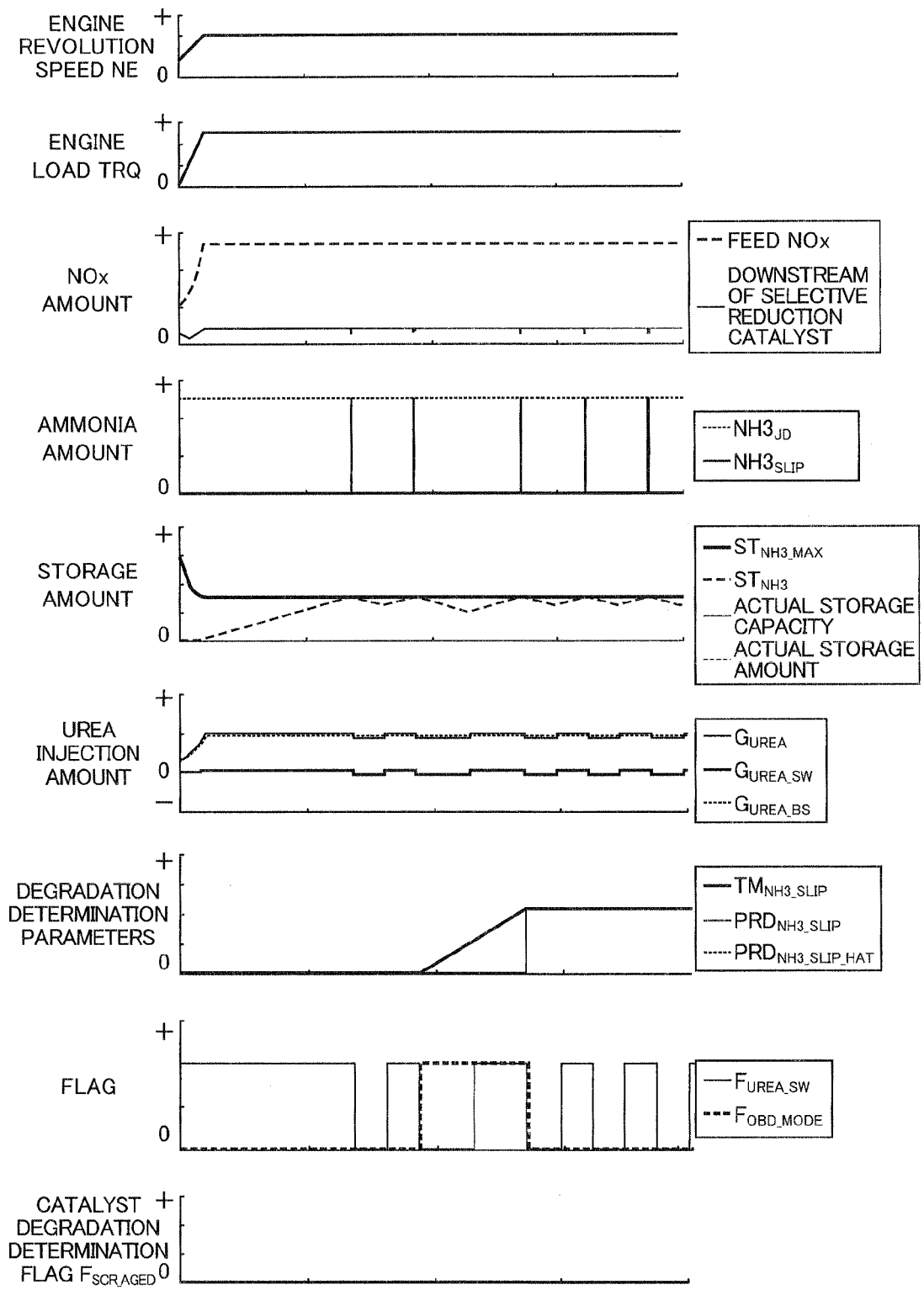
FIG. 19 presents graphs showing the results of simulation of urea injection control according to the embodiment (CASE 1)

FIG. 19 shows the simulation results of CASE 1. It should be noted that the actual storage capacity and storage amount of the selective reduction catalyst substantially match the storage capacity estimated value $ST_{NH3\_MAX}$ (bold line) and storage amount estimated value $ST_{NH3}$ (bold dotted line) with a selective reduction catalyst in the new-article state selected as the reference state, respectively.

In CASE 1, the selective reduction catalyst is in the new-article state. As a result, the time at which the slip occurrence timing $PRD_{NH3\_SLIP}$ indicated by a solid line acquires a value, and the time at which the estimated slip occurrence timing $PRD_{NH3\_SLIP\_HAT}$ indicated by the dotted line acquires a value are substantially synchronous. For this reason, the catalyst degradation determination flag $F_{SCR\_AGED}$ remains "0", and the selective reduction catalyst is determined to be normal.

Figure 20:
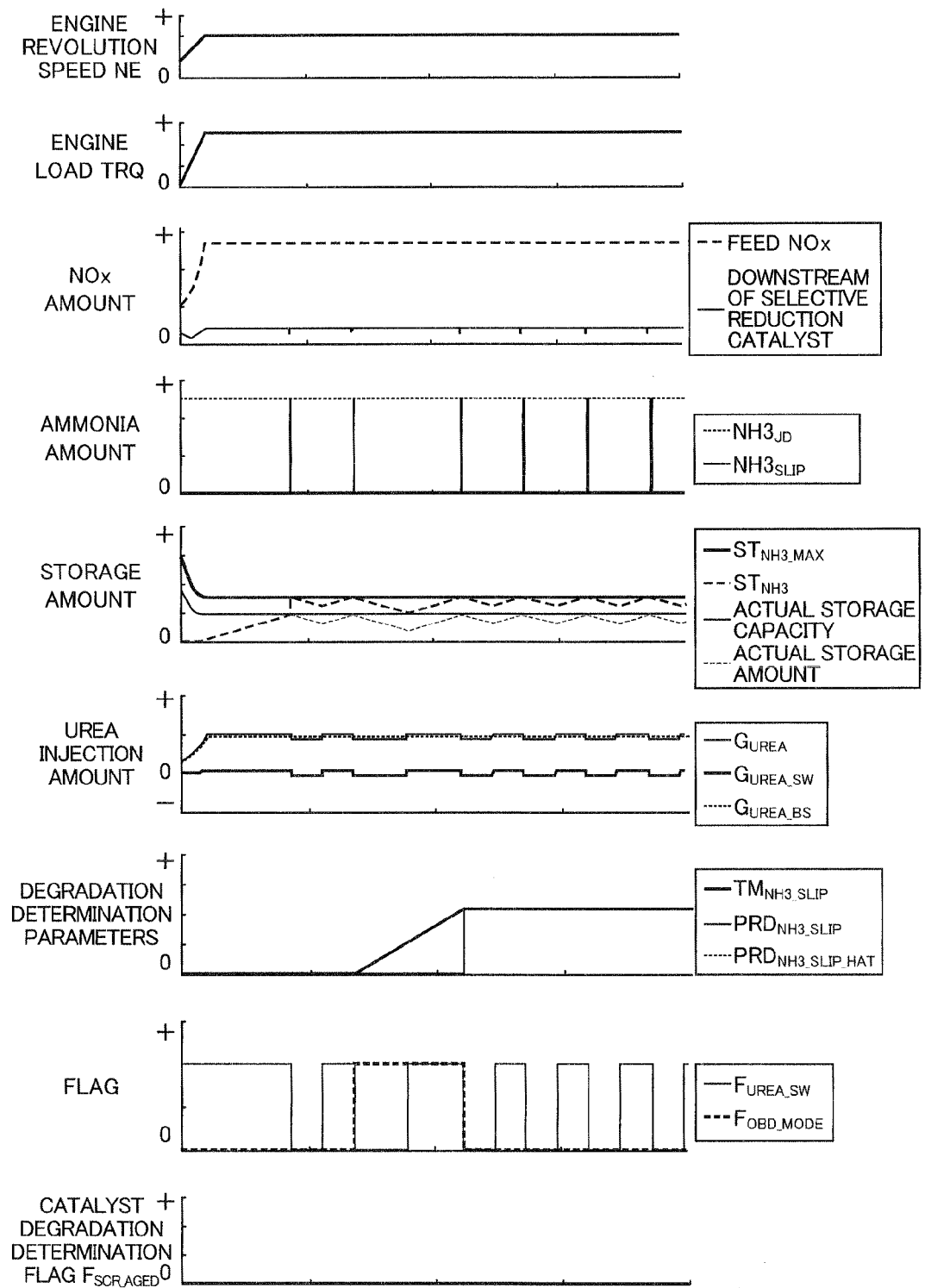
FIG. 20 presents graphs showing the results of simulation of urea injection control according to the embodiment (CASE 2)

FIG. 20 shows the simulation results of CASE 2.

In CASE 2, the selective reduction catalyst is in a normal state having degraded from the new-article state of CASE 1. As a result, the actual storage capacity (thin line) and storage amount (thin dotted line) of the selective reduction catalyst are respectively smaller than the storage capacity estimated value $ST_{NH3\_MAX}$ (bold line) and storage amount estimated value $ST_{NH3}$ (bold dotted line) with the selective reduction catalyst in the new-article state selected as the reference state.

However, since the actual storage amount of the selective reduction catalyst does not become zero, even if setting the catalyst degradation determination mode flag $F_{OBD\_MODE}$ to "1" to reduce the storage amount by the detection reduced-amount portion $DST_{NH3\_JD}$ (not illustrated), the time at which the slip occurrence timing $PRD_{NH3\_SLIP}$ indicated by the solid line acquires a value and the time at which the estimated slip occurrence timing $PRD_{NH3\_SLIP\_HAT}$ indicated by the dotted line acquires a value are substantially synchronous. As a result, the catalyst degradation determination flag $F_{SCR\_AGED}$ remains "0", and the selective reduction catalyst is determined to be normal.

Figure 21:
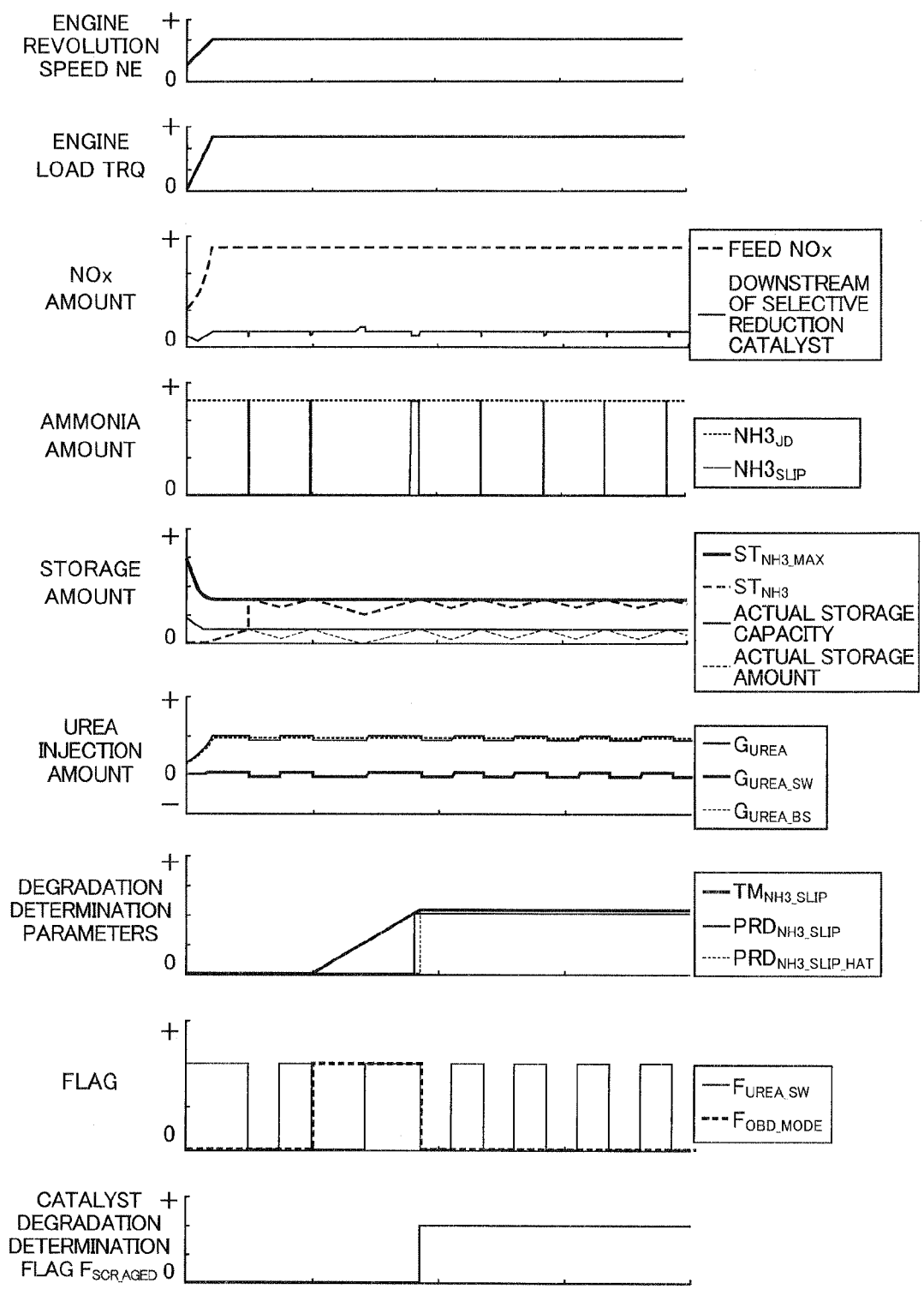
FIG. 21 presents graphs showing the results of simulation of urea injection control according to the embodiment (CASE 3)
Figure 22:
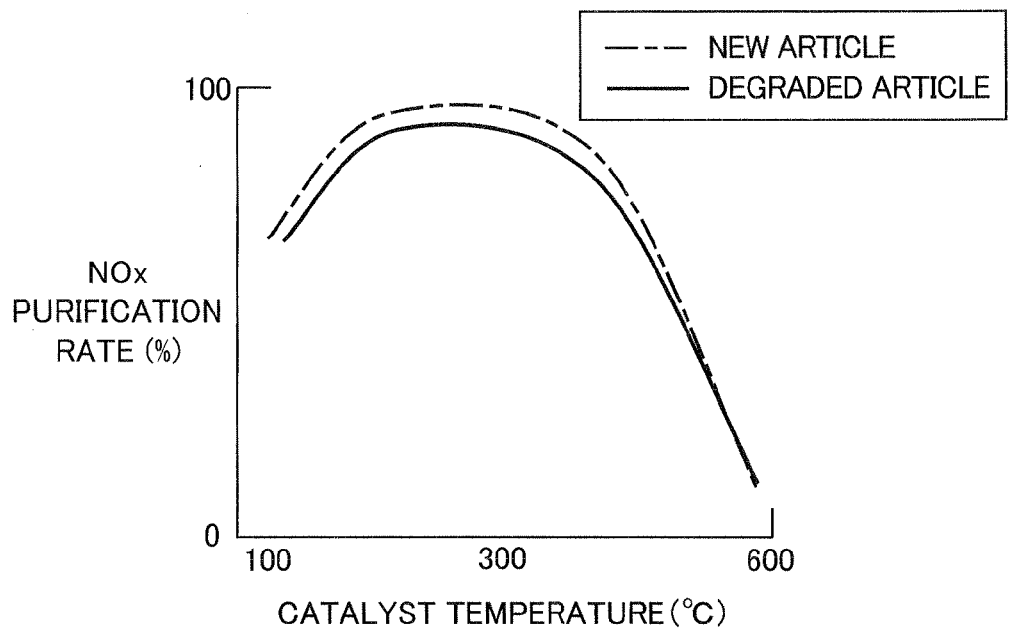
FIG. 22 is a graph showing the temperature characteristics of the NOx purification rate of the selective reduction catalyst.
Figure 23:
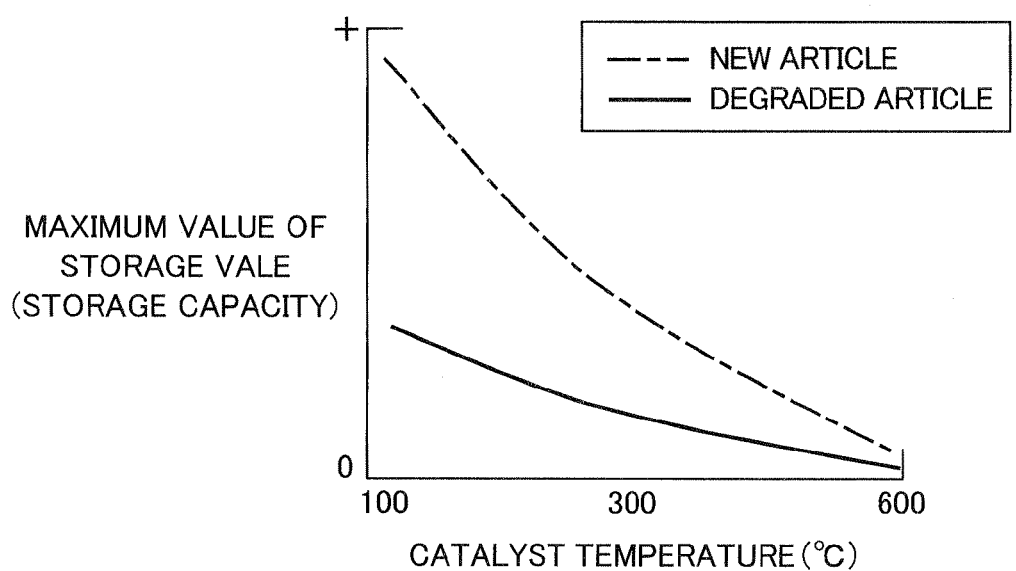
FIG. 23 is a graph showing the temperature characteristics of the storage capacity of the selective reduction catalyst.

FIG. 21 shows the simulation results of CASE 3.

In CASE 3, the selective reduction catalyst is in a degraded state. As a result, the actual storage capacity (thin line) and storage amount (thin dotted line) of the selective reduction catalyst are respectively smaller than the storage capacity estimated value $ST_{NH3\_MAX}$ (bold line) and storage amount estimated value $ST_{NH3}$ (bold dotted line) with the selective reduction catalyst in the new-article state selected as the reference state.

Therefore, the actual storage amount of the selective reduction catalyst becomes zero and ammonia slip occurs when reducing the storage amount by the detection reduced-amount portion $DST_{NH3\_JD}$ (not illustrated), accompanying setting the catalyst degradation determination mode flag $F_{OBD\_MODE}$ to "1". As a result, the time at which the slip occurrence timing $PRD_{NH3\_SLIP}$ indicated by a solid line acquires a value is earlier than the time at which the estimated slip occurrence timing $PRD_{NH3\_SLIP\_HAT}$ indicated by a dotted line acquires a value. Then, the slip occurrence time difference $DPRD_{NH3\_SLIP}$ (not illustrated) becomes a value that is larger than the threshold value $DPRD_{NH3\_SLIP\_JD}$/the catalyst degradation determination flag $F_{SCR\_AGED}$ is updated to "1", and the selective reduction catalyst is determined to be in a degraded state.

According to the present embodiment, the following effects are exerted.

(1) According to the present embodiment, for a selective reduction catalyst in a state in which the storage amount is a maximum, the storage amount thereof is reduced by a detection reduced-amount portion $DST_{NH3\_JD}$, and then the urea injection amount $G_{UREA}$ is increased from a reference injection amount $G_{UREA\_BS}$ until the slip determination flag $F_{NH3\_SLIP}$ is set to "1" by the slip determination portion 34, and degradation of the selective reduction catalyst is determined based on determination results at this time from the slip determination portion 34.

Herein, the detection reduced-amount portion $DST_{NH3\_JD}$ is set to a value that is larger than the storage capacity $ST_{NH3\_MAX\_NGCAT}$ of the selective reduction catalyst in a degraded state and smaller than the storage capacity $ST_{NH3\_MAX\_OKCAT}$ of the selective reduction catalyst in a normal state. With this, it is possible to prevent a temporary decline in purification performance accompanying the determination of degradation, since the storage amount does not become zero while fluctuating the storage amount of the selective reduction catalyst in order to determine degradation, in a case of the selective reduction catalyst at least being in a normal state. In addition, it is possible to raise the determination precision by determining degradation based on the storage capacity of the selective reduction catalyst in this way.

(2) According to the present embodiment, the degradation determination precision can be improved by determining degradation based on the difference between the slip occurrence timing $PRD_{NH3\_SLIP}$ and the estimated slip occurrence timing $PRD_{NH3\_SLIP\_HAT}$ (TYPE 1), the difference between the slip occurrence timing $PRD_{NH3\_SLIP}$ and the estimated slip occurrence timing $PRD_{NH3\_SLIP\_HAT}'$ (TYPE 2), the difference between the slip occurrence time variation amount $SUM_{UREA\_SLIP}$ and the estimated slip occurrence time variation amount $SUM_{UREA\_SLIP\_HAT}$ (TYPE 3), and the difference between the slip occurrence time variation amount $SUM_{UREA\_SLIP}'$ and the estimated slip occurrence time variation amount $SUM_{UREA\_SLIP\_HAT}'$ (TYPE 4).

(3) According to the present embodiment, even in a case of the running conditions changing, such as the catalyst temperature, operating load of the engine, and fluctuating state of this operating load, since the slip estimation flag $F_{NH3\_SLIP\_HAT}$ is determined based on the estimated value $ST_{UREA}$ of the storage amount of the selective reduction catalyst in a reference state, and this change can be assumed to be a reference parameter by calculating the reference parameter ($PRD_{NH3\_SLIP\_HAT}$, $PRD_{NH3\_SLIP\_HAT}'$, $SUM_{UREA\_SLIP\_HAT}$, and $SUM_{UREA\_SLIP\_HAT}'$) based on this slip estimation flag $F_{NH3\_SLIP\_HAT}$, it is possible to make the degradation determination results unaffected by the running conditions. Therefore, the determination precision of the degradation of the selective reduction catalyst can be further improved.

(4) According to the present embodiment, NOx in exhaust can be reliably purified even while determining the degradation, by fluctuating the storage amount in a selective reduction catalyst that is in a state in which the storage amount is a maximum and the catalyst temperature thereof is within a range in which NOx in the exhaust can be purified. Therefore, it is possible to further suppress a temporary decline in purification performance accompanying the determination of degradation.

It should be noted that the present invention is not limited to the aforementioned embodiment, and various modification are possible.

Although the estimated value $ST_{NH3}$ of the storage amount and the estimated value $ST_{NH3\_MAX}$ of the storage capacity of the selective reduction catalyst were set as values having a scale of the amount of urea water in the above-mentioned embodiment, it is not limited thereto. For example, similar effects are exerted even if set to values having a scale of the amount of ammonia generated from this urea water.

In addition, although an example was exemplified in which the present invention was applied to an exhaust purification system of urea addition-type that uses ammonia as a reducing agent and supplies urea water as an additive to be the source of this reducing agent in the above-mentioned embodiment, it is not limited thereto.

For example, ammonia may be directly supplied without supplying urea water to generate ammonia from this urea water. In addition, the additive to be the source of ammonia is not limited to urea water, and another additive may be used. Moreover, the reducing agent for reducing NOx is not limited to ammonia. The present invention can be applied to an exhaust purification system using hydrocarbons in place of ammonia, for example, as the reducing agent for reducing NOx.

What is claimed is:

1. A catalyst degradation determination device for an exhaust purification system of an internal combustion engine equipped with a selective reduction catalyst that is provided in an exhaust channel of the internal combustion engine, and reduces NOx in exhaust flowing through the exhaust channel under the present of a reducing agent, and
   a reducing agent supply means for supplying a reducing agent or an additive serving as a source of the reducing agent to the selective reduction catalyst, the device comprising:
   a slip determination means for determining occurrence of reducing agent slip in the selective reduction catalyst, wherein an amount of the reducing agent stored in the selective reduction catalyst is defined as a storage amount, and an amount of the reducing agent that is stored by the selective reduction catalyst defined as a storage capacity;
   a storage amount fluctuating means for reducing, in a selective reduction catalyst in a state in which the storage amount is a maximum, the storage amount thereof by a predetermined detection reduced-amount portion by way of controlling the reducing agent supply means, and then increasing the storage amount thereof until it is determined by way of the slip determination means that reducing agent slip has occurred; and
   a catalyst degradation determination means for determining degradation of the selective reduction catalyst based on determination results of the slip determination means when fluctuating the storage amount by way of the storage amount fluctuating means,
   wherein the detection reduced-amount portion is set to a value that is larger than the storage capacity of the selective reduction catalyst in a predetermined degradation state, and smaller than the storage capacity of the selective reduction catalyst in a predetermined normal state.

2. A catalyst degradation determination device for an exhaust purification system according to claim 1, wherein the catalyst degradation determination means determines degradation of the selective reduction catalyst based on a difference between a predetermined reference parameter and a parameter correlated to an elapsed time since initiating a decrease in storage amount by way of the storage amount fluctuating means until it is determined by the slip determination means that reducing agent slip has occurred.

3. A catalyst degradation determination device for an exhaust purification system according to claim 2, wherein the reference parameter is calculated based on an estimated value of storage amount of the selective reduction catalyst in a predetermined reference state.

4. A catalyst degradation determination device for an exhaust purification system according to claim 1, wherein the catalyst degradation determination means determines degradation of the selective reduction catalyst based on a difference between a predetermined reference parameter and a parameter correlated to an elapsed time since initiating an increase in storage amount by way of the storage amount fluctuating means until it is determined by the slip determination means that reducing agent slip has occurred.

5. A catalyst degradation determination device for an exhaust purification system according to claim 4, wherein the reference parameter is calculated based on an estimated value of storage amount of the selective reduction catalyst in a predetermined reference state.

6. A catalyst degradation determination device for an exhaust purification system according to claim 1, wherein the catalyst degradation determination means determines degradation of the selective reduction catalyst based on a difference between a predetermined reference parameter and a parameter correlated to a variation in storage amount during a time from initiating a decrease in storage amount by way of the storage amount fluctuating means until it is determined by the slip determination means that reducing agent slip has occurred.

7. A catalyst degradation determination device for an exhaust purification system according to claim 6, wherein the reference parameter is calculated based on an estimated value of storage amount of the selective reduction catalyst in a predetermined reference state.

8. A catalyst degradation determination device for an exhaust purification system according to claim 1, wherein the catalyst degradation determination means determines degradation of the selective reduction catalyst based on a difference between a predetermined reference parameter and a parameter correlated to a variation in storage amount during a time from initiating an increase in storage amount by way of the storage amount fluctuating means until it is determined by the slip determination means that reducing agent slip has occurred.

9. A catalyst degradation determination device for an exhaust purification system according to claim 8, wherein the reference parameter is calculated based on an estimated value of storage amount of the selective reduction catalyst in a predetermined reference state.

10. A catalyst degradation determination device for an exhaust purification system according to claim 1, wherein the storage amount fluctuating means fluctuates the storage amount in a selective reduction catalyst that is in a state in which the storage amount is a maximum, and a temperature thereof is within a range in which purification of NOx in exhaust is possible.

* * * * *